US011086972B2

(12) United States Patent
Deaver

(10) Patent No.: US 11,086,972 B2
(45) Date of Patent: *Aug. 10, 2021

(54) METHODS FOR CONTROLLING ACCESS TO DIGITAL ASSETS

(71) Applicant: F. Scott Deaver, San Diego, CA (US)

(72) Inventor: F. Scott Deaver, San Diego, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 16/004,867

(22) Filed: Jun. 11, 2018

(65) Prior Publication Data

US 2018/0293364 A1 Oct. 11, 2018

Related U.S. Application Data

(63) Continuation of application No. 15/000,186, filed on Jan. 19, 2016, now Pat. No. 9,996,680.

(Continued)

(51) Int. Cl.
*G06F 21/00* (2013.01)
*G06F 21/12* (2013.01)

(Continued)

(52) U.S. Cl.
CPC ............ *G06F 21/12* (2013.01); *G06F 21/125* (2013.01); *G06F 21/14* (2013.01); *G06F 21/6218* (2013.01); *G06F 2221/0797* (2013.01)

(58) Field of Classification Search
CPC .......... G06F 21/12; G06F 21/6218; G06F 2221/0797; G06F 21/125; G06F 21/14
See application file for complete search history.

(56) References Cited

U.S. PATENT DOCUMENTS 8,688,583 B2 * 4/2014 Boccon-Gibod ..... H04L 9/0825
705/51
2003/0084306 A1 * 5/2003 Abburi ............... G06F 21/10
713/188

(Continued)

*Primary Examiner* — Tri M Tran
(74) *Attorney, Agent, or Firm* — Cardle Patent Law CHTD

(57) ABSTRACT

The apparatus disclosed herein, in various aspects, includes a digital asset, and an amulet that comprises an encrypted self-validating string. The amulet may be external to the digital asset. The apparatus may include a manager that cooperates securely with the digital asset and cooperates securely with the amulet to control access to the digital asset as specified by the amulet. In some aspects, the manager cooperates with the digital asset and with the amulet, at least in part, through shared memory in process space. In other aspects, the manager cooperates with the digital asset and with the amulet, at least in part, through a RAM drive in memory, the RAM drive at least partially hidden from an operating system of the computer. In yet other aspects, the manager cooperates with the digital asset and with the amulet, at least in part, through a virtual machine accessible only by said apparatus. The amulet, the manager, and the digital asset are either operably receivable by a computer or are operably received by the computer, in various aspects. Related methods and compositions of matter are also disclosed.

This Abstract is presented to meet requirements of 37 C.F.R. § 1.72(b) only. This Abstract is not intended to identify key elements of the apparatus, methods, and compositions of matter disclosed herein or to delineate the scope of this disclosure.

20 Claims, 16 Drawing Sheets

Related U.S. Application Data

(60) Provisional application No. 62/104,831, filed on Jan. 18, 2015.

(51) Int. Cl.
*G06F 21/62* (2013.01)
*G06F 21/14* (2013.01)

(56) References Cited

U.S. PATENT DOCUMENTS

2004/0255115 A1\* 12/2004 DeMello ................. G06F 21/10
713/156
2007/0169003 A1\* 7/2007 Branda ............... G06F 11/3409
717/130

\* cited by examiner

An example of text steganography

US 11,086,972 B2

METHODS FOR CONTROLLING ACCESS TO DIGITAL ASSETS

CROSS-REFERENCE TO RELATED APPLICATIONS

The present application is a continuation of U.S. patent application Ser. No. 15/000,186 filed 19 Jan. 2016 that, in turn, claims priority and benefit of U.S. Provisional Patent Application No. 62/104,831 filed 18 Jan. 2015, all of which are hereby incorporated by reference in their entireties herein.

BACKGROUND OF THE INVENTION

Field

This disclosure relates to computer apparatus and related methods and compositions of matter and, more particularly, the protection of other digital assets from unauthorized access.

Background

The distribution of software from a developer to an end user may present several problems including the protection of intellectual property embodied within the computer software, the prevention of unauthorized copying, stealing, or hacking of the software, the promotion of fair use of and the payment for the computer software, and the enablement of distribution of computer software in forms such as interpreted computer language, which may allow the end user flexibility in implementation, but that are inherently insecure.

For example, software comprising one or more interpreted language based components written in interpreted computer language(s) may be adventitious to the end user. Interpreted language components may be accessible for inspection by the end user, which may allow the end user to modify the interpreted language based components in order to customize the interpreted language based components to the end user's particular requirements. The end user may, for example, modify the order of execution or the parameter values passed to subroutines within the interpreted language based components, or add, remove, or modify interpreted language based components to reduce complexity, to improve efficiency, or to address specific needs of the end user.

Interpreted language based components may be inspected, which may enhance the end user's ability to modify interpreted language based components. However, because interpreted language based components may be inspected, algorithms and associated methods of implementation embodied in interpreted language based components may be disclosed through inspection, and, thus, may be subject to being copied, stolen, or hacked by an unauthorized user.

Inspection of the script of the interpreted language based component may allow the unauthorized user may learn the names and parameter requirements of, for example, COM, DLL, or Python interpreter components called by the interpreted language based component(s) and call these directly from any interpreted language based component or compiled language based component. Compilation or obfuscation of interpreted language based components to prevent inspection of the interpreted language based components eliminates the end user's ability to modify these now compiled or obfuscated components, and, therefore destroys the advantage of interpreted language based components to the end user.

Compiled language based components of the software may also be copied, stolen, or hacked because parameters such as access keys, login names, passwords, and parameters passed to compiled language based components may be read, copied, or hijacked. For example, an unauthorized user may copy portions of the interpreted language based component that sets environment requirements (e.g. access keys, login names, passwords, and parameters) for a particular compiled language based component. The unauthorized user may then invoke the compiled language based component in the same manner as the interpreted language based component(s), passing the same access keys, login names, passwords, and parameters to the compiled language based component.

.Net framework languages have become ubiquitous. While the .Net framework languages are interpreted computer languages and, therefore, open to inspection, .Net framework languages may be compiled into an intermediate bytecode and the bytecode may be obfuscated. However, components based on bytecode derived from .Net framework language(s) may be decompiled even when obfuscated. Because of the reliance on reflection for messaging within .Net languages, the primary information needed by the unauthorized user remains open to inspection even after obfuscation. In .Net bytecode (MIDL) compilers, the externally-callable entry points are well-known and published, and the obfuscation of the entry points is limited by the legitimate external caller's need to access the entry points. To re-use the code means merely copying the code into the unauthorized user's code space and then accessing the code via the entry points.

The Chinese have become so proficient at decompiling .Net code that new releases of software written in .Net may be available on Chinese servers to unauthorized users within hours of release. Although seemingly not posing a barrier to unauthorized users, obfuscation may be problematic because the obfuscated components are not the same as the interpreted language based components, which may result in obfuscated code becoming unsupportable.

Software written in unmanaged compiled languages such as C and C++is vulnerable to being copied, stolen, or hacked because of the nature of the ubiquitous "purchase-a-license-key-to-install-a-fully-functional-version-of-the-application" paradigm. While lack of a key may in fact inhibit running the software as intended, the lack of the key may not prevent calling into exported functions available in the DLLs included with the software. Furthermore, the end user's rights and capabilities may be fixed in the software by the developer outside the control of the end user, and the end user may be powerless to modify such compiled language software without the cooperation of the developer. The end user, for example, may wish to reassign the software to a different employee as employees leave, are reassigned, and so forth, and the end user may need the cooperation of the developer to reassign the software.

The developer may use a hardware dongle to control access to the software in order to prevent unauthorized use of the software. However, the hardware dongle only protects the running instance of the software. The hardware dongle has no effect on the ability to reverse-engineer, examine, or modify, copy, or steal the components that constitute the software. Furthermore, a hardware dongle can be circumvented. For example, the USB port is a published, signaled, streaming, digital interface. A signal is raised or dropped, and a stream of simple 1's and 0's at regulated speeds is input or output at the USB port. In order to replace the hardware dongle, the hardware dongle signal generated by the hardware dongle may be determined. Then, a duplicate signal that duplicates the hardware dongle signal may be generated at the USB port to initiate the software.

Hardware dongles have other problems. Organizations are eliminating USB ports from their computers precisely because USB ports are inherently insecure. For example, gigabytes of proprietary information can be downloaded from an organization's computer system onto a thumb drive via a USB port in a moment. Dongle-secured software cannot be downloaded for immediate use because the hardware dongle must be shipped physically. The end user cannot immediately transfer the software to a geographically distant branch office entirely via network because the hardware dongle must be shipped physically to that branch office. Hardware dongles must be protected from theft, loss, or destruction. The hardware dongle must be linked both physically and electronically to the corresponding software. Until one has encountered hardware dongles tied to various versions of multiple copies of software, with each version in a different update and enabled options state, all mixed together in a box, one cannot really appreciate the dark side of hardware dongles.

Accordingly, there is a need for improved apparatus to secure computer software as well as related methods and compositions of matter.

BRIEF SUMMARY OF THE INVENTION

These and other needs and disadvantages may be overcome by the apparatus disclosed herein. Additional improvements and advantages may be recognized by those of ordinary skill in the art upon study of the present disclosure.

The apparatus disclosed herein, in various aspects, includes a digital asset, and an amulet that comprises an encrypted self-validating string. The amulet may be external to the digital asset. The apparatus may include a manager that cooperates securely with the digital asset and cooperates securely with the amulet to control access to the digital asset as specified by the amulet. In some aspects, the manager cooperates with the digital asset and with the amulet, at least in part, through shared memory in process space. In other aspects, the manager cooperates with the digital asset and with the amulet, at least in part, through a RAM drive in memory, the RAM drive at least partially hidden from an operating system of the computer. In yet other aspects, the manager cooperates with the digital asset and with the amulet, at least in part, through a virtual machine accessible only by said apparatus. The amulet, the manager, and the digital asset are either operably receivable by a computer or are operably received by the computer, in various aspects.

The apparatus may include a tool that cooperates with the digital asset to allow a user to select a component of the digital asset, and that allows the user to creation of an amulet that controls access to the component. In various aspects, the tool allows selection of one or more control parameters of the amulet in combinations with selection of control logic of the amulet. The tool may convert the component from interpreted language into a compiled language, and the tool may produces machine code by multi-pass compilation of the component with optimization and obfuscation.

The apparatus may include multiple amulets with each amulet of the multiple amulets conferring a different right of access to the digital asset. The apparatus may include multiple amulets controlling access to corresponding differ-ing digital assets. At least portions of the apparatus disclosed herein may be implemented in an operating system of the computer. The apparatus disclosed herein may be implemented, at least in part, using networked communication.

Related methods of use are disclosed herein. Compositions of matter that implement at least portions of the apparatus and related methods are also disclosed herein.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

Figure 1:
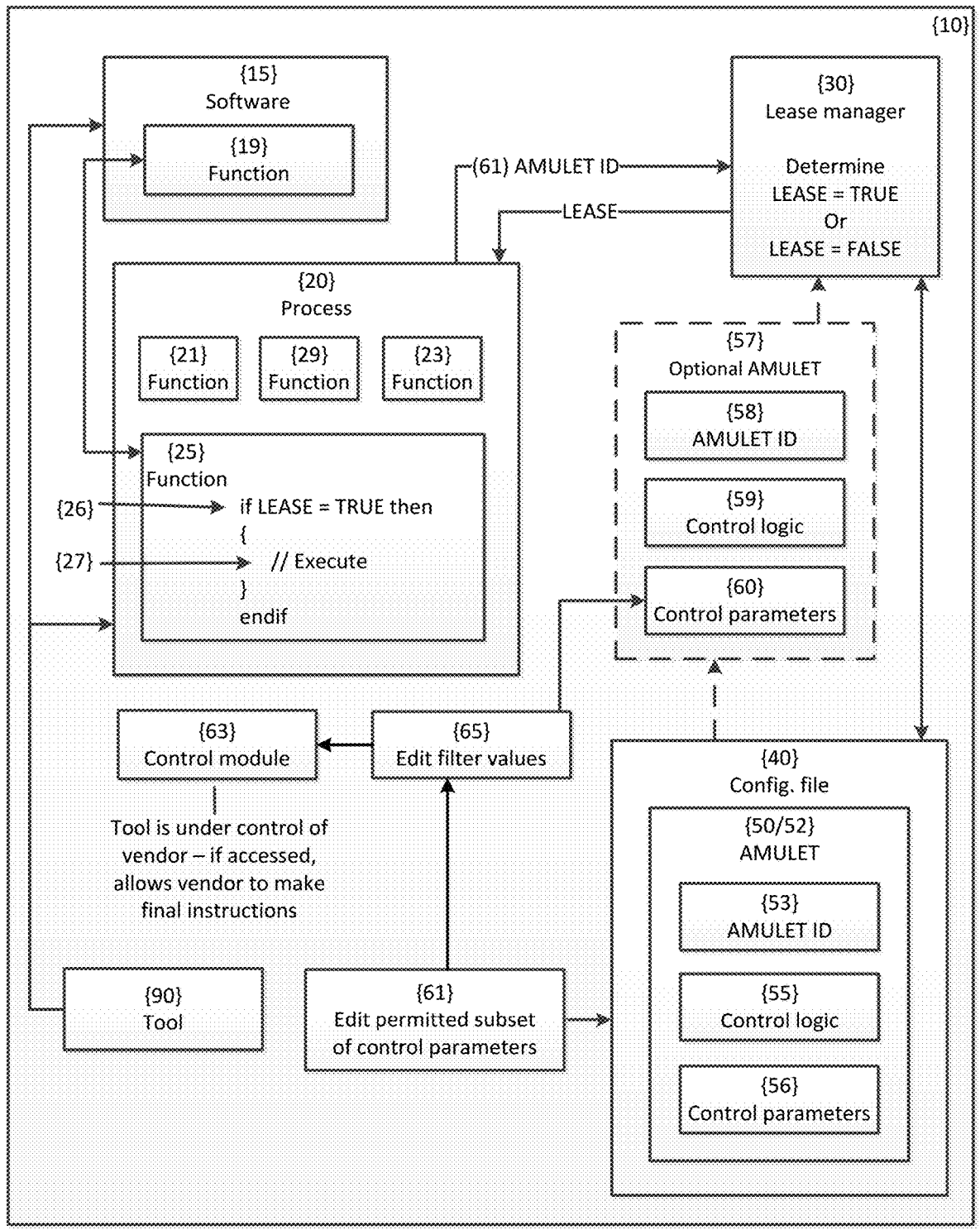
FIG. 1 illustrates by schematic diagram an exemplary implementation of a software management apparatus.

The Figures are exemplary only, and the implementations illustrated therein are selected to facilitate explanation. The Figures including the apparatus, processes, and compositions of matter illustrated in the Figures are not to be considered limiting unless expressly so stated. For example, the components of various apparatus illustrated in the Figures may be selected for explanatory purposes, and the components may be grouped in the Figures in various ways to facilitate description, so that the apparatus may include various other components or the components may be grouped in various other ways, in other implementations. The steps in the various processes illustrated in the Figures may be performed, for example, in other orders or the steps may be divided or subdivided in various ways, in other implementations. Information flows and process flows in the Figures included herein are indicated by arrows, and it should be understood that additional information flows may occur between various components and that other process flows may occur, in various other implementations. Where used in the various Figures, the same numerals designate the same or similar elements. When positional terms and other terms such as "top," "bottom," "right," "left," "forward," "rear," "first," "second," "inside," "outside," are used, such terms should be understood in reference to the orientation of the implementations shown in the Figures and are utilized only to facilitate description of the Figures. Relative terms such as "about" or "approximately" may be defined in terms of standard engineering tolerances as would be understood by those of ordinary skill in the art. These engineering tolerances, for example, may be ±1%, ±2.5%, or ±5%, in various implementations.

DETAILED DESCRIPTION OF THE INVENTION

A software management apparatus and related methods and compositions of matter are disclosed herein. In various aspects, the software management apparatus is directed toward the protection of a digital asset from unauthorized access. The digital asset may include, for example, software and data including textual, visual, and audio information. Unauthorized access may include, for example, viewing, copying, execution, or other operations with or by the digital asset. The software management apparatus includes an AMULET that is an encrypted self-validating unique string. The AMULET controls access to the digital asset. For example, the execution of a segment within a function that forms a part of as software, the software being the digital asset, may be using control logic and control parameters embedded within the AMULET. The function is formed as an executable file compiled from a source code file using a multi-pass compiler with optimizations and obfuscation, in various aspects. Accordingly, the function including the segment within the function controlled by the AMULET may be regarded as generally secure. The AMULET is external to the function, and various portions of the software management apparatus moderate securely the interaction between the AMULET and the segment within the function to allow the AMULET to control the execution of the segment within the function, in various aspects.

It may be that the problem of protection of digital assets requires an "every man for himself" approach, where it is the responsibility of the digital asset to protect itself rather than relying on the security of networks, operating systems and so forth, which cannot be relied upon. In various aspects, the software management apparatus and related methods and compositions of matter are directed toward the protection of the digital asset, as opposed to protecting streamed information or as opposed to relying upon externalities over which the digital asset has no control. Rather, the digital asset is protected by the software management apparatus that, in various aspects, has fine-grained control over the digital asset.

The software management apparatus disclosed herein may offer an alternative to requiring every developer to "roll their own" based on whatever limited security experience is available to the developer or organization, causing absolute chaos in the implementation and effectiveness of protection from one application to another. The software management apparatus and related methods and compositions of matter, in various aspects, provides a standard apparatus including tools for implementation that provides task-specific security without dependence on an O/S and without increasing costs. The software management apparatus may be operable universally across operating systems and platforms, in various aspects.

The software management apparatus, in various aspects, includes a tool that allows a developer to select the segment of the function from the target software and to establish AMULET control of the segment so selected. The tool may translate the source code of the function from an interpreted language into a compiled language and then compile the function including the segment and the added code within the function that enables AMULET control of the segment. The tool, in various aspects, allows the developer to select control logic and select control parameters to be embedded within the AMULET to control the execution of the segment in ways desired by the developer, and the tool encrypts the control logic and control parameters to form the AMULET. The tool creates an install package that installs onto the host computer the AMULET, the target software in executable form including the function with segment protected by the AMULET, and, if necessary, portions of the software management apparatus that moderate secure interaction between the AMULET and the function, in various aspects. The portions of the software management apparatus that moderate secure interaction between the AMULET and the function may be installed upon a computer along with the target software including the function, may pre-exist on the computer as the result of a previous installation, or may be incorporated in the operating system of the computer, in various aspects.

The tool, in various aspects, may be accessible via Internet. Various related methods of operation and related compositions of matter are disclosed herein.

In various aspects, a standardized O/S-independent (or in the alternative, multiple-O/S-tolerant) infrastructure or framework which provides reliable a la carte security services and options along with O/S-independent enforcement modules packaged with and inseparable from the digital asset is disclosed herein. That is, to remove dependence on external systems over which the digital asset has no control and replace it with a design over which the secured asset has fine-grained control, which may be applied universally across all systems upon which it finds itself hosted. This approach may also eliminates any value to the human-engineering hacking that gains the hacker access to protected digital assets, since the mere possession of those assets is rendered meaningless.

In various aspects, the amulet that is linked to the digital asset may require the testing of:
 1. Other files available (or not available) on the device's local file system, including tests for path, name (including wildcards), timestamp, file size, and SHA-2 checksum;
 2. Other processes in (or not in) the host device's memory;
 3. The module from which access to a protected element is being requested, including tests for path, name (including wildcards), timestamp, file size, and SHA-2 checksum;
 4. The process or child thread from which access to a protected element is being requested, including tests for the launching executable file's path, name (including wildcards), timestamp, file size, and SHA-2 checksum;
 5. Setting up a protected environment for the script or code to run in or from, separate and apart from the host device's physical file system or the running process making the access request;
 6. How many instances of the protected element are already running in memory, divided into those called from specific processes and child threads and those called from specific modules?;
 7. Passing access requests through to custom access handlers written by the software developer and plugged into the infrastructure;
 8. Allowing a vendor to pass some of the access criteria through to the customer (such as a systems administrator for a client);

9. GPS location via simple or combined GPS polygons, down to specific cubicles in a building;
10. BIOS settings in the host device;
11. Installed hardware on the host device;
12. Internet address(es) assigned to the host device;
13. MAC address(es) assigned to hardware on the host device;
14. Windows registry contents for devices hosting a Windows operating system;
15. Remote controls based on contents of specific files and/or results of program executions on devices accessible by Internet, Ethernet backbone, text (SMS), Wi-Fi, and/or 3G/4G connections;
16. Time ranges of any length, patterns of repetition, or number of repetitions;
17. Logged-on user or user group memberships; and
18. User keyboard and mouse activity (or lack thereof).

In this type of security metaphor, all assets may be multiply encrypted, so having physical possession of or connection with the file becomes meaningless. Engaging the secured asset would require being properly acknowledged by the enforcement module within the new infrastructure, which would obtain the required criteria for each of the items from encrypted information connected to the asset by the amulet such as those criteria from the list above.

The apparatus and methods disclosed herein are generally implemented, at least in part, in software comprising computer readable instructions adapted to execute upon one or more computers to configure the one or more computers as the apparatus or to cause the one or more computers to perform the method steps. Software may be, for example, in the form of high-level code such as C or Java, or may be in the form of machine code. In some aspects, the software may execute on one computer. In other aspects, two or more computers may communicate with one another via network, and the software may be organized in various ways such that portions of the software may be distributed over the two or more computers to be executed by the two or more computers. The software may be configured into modules, and the modules may be organized in various ways in various aspects. Modules include routines, programs, components, data structures, etc., that perform particular tasks or implement particular abstract data types. Although generally described as implemented by software, the methods disclosed herein may be implemented in software, hardware, or combinations of software and hardware, in various aspects.

Computer, as used in this disclosure, includes a terminal that may have a computer screen, keyboard, and mouse, and is linked by network to a server. In such an aspect, various software, including software disclosed herein, may execute on the one or more processors in the server, and the computer screen provides a visual input/output interface from the server to the user. Computer further includes a computer with one or more processors, memory, computer screen(s), mouse, keyboard, storage device(s), and so forth. Computer further includes, for example, single-processor or multiprocessor computers, minicomputers, mainframe computers, as well as personal computers, hand-held computing devices, tablets, cellular telephones that include a processor, network hardware that comprises a processor (e.g. modems, routers, switches, satellite uplink/downlink transmitters and receivers, packet sniffers, or domain name servers), and processor-based or programmable consumer electronics. Computer may be cloud based at least in part, in various aspects. Computer screen includes one or more computer screens in communication with the computer that may be generally viewed by a user.

As used herein, the terms apparatus, component, and system may refer to a computer-related entity, either hardware, a combination of hardware and software, software operably received by a computer, or software in execution by a computer. For example, an apparatus may include a computer as well as various components of the computer such as a processor, memory, storage devices, computer screen, and communication interfaces (e.g. USB port, Ethernet port,). Apparatus may include network communication hardware and software operably received by the network, in various implementations. Apparatus may include software in execution by a processor, an object, an executable, and a thread, in various implementations. One or more apparatus, in various implementations, may reside within a process and/or thread, and an apparatus may be localized on one computer, distributed between two or more computers, distributed over a network including the cloud.

The compositions of matter disclosed herein include non-transitory computer readable media that may be used to store computer readable instructions. The computer readable instructions stored by the computer readable media, when executed, cause a computer to perform various operations as directed by the computer readable instructions. Computer readable media may include, for example, RAM, ROM, EEPROM, flash memory or other memory technology, CD-ROM, digital videodisk (DVD) or other optical storage devices, magnetic cassettes, magnetic tape, magnetic disk storage, or other magnetic storage devices.

Network, as used herein, includes local area networks, wide area networks, the Internet (the cloud), and combinations thereof. Communication may be conducted over the network by various wired and wireless technologies and combinations thereof. Computers may be networked with one another, and storage, various input/output devices, servers, routers and suchlike may be provided about the network, as would be recognized by those of ordinary skill in the art upon study of this disclosure. As would be recognized by those of ordinary skill in the art upon study of this disclosure, the methods, apparatus, and compositions of matter disclosed herein may be practiced in distributed computing environments including local area networks, enterprise level networks, and the cloud.

Machine code, as used herein, includes machine code instructions executable by a processor. Each machine code instruction has the form of a pattern of bits that corresponds to a command to the processor, so that each machine code instruction may be represented in binary form. The commands to the processor as directed by machine code instructions may include, for example, loading values into registers, performing arithmetic or logical operations, placement of the result of the arithmetic or logical operation into a specified register, jumps, moves, increments, decrements, and register shifts.

In a complied programming language, in various aspects, a source code file containing a multiplicity of source code instructions expressed in the complied programming language is compiled by a compiler in its entirety into an executable file containing machine code instructions. The processor may then execute the machine code instructions of the executable file. Each source code instruction may translate into a number of machine code instructions. The executable file may be optimized in various ways by the compiler, and the compiler may create a number of successive intermediate files resulting from a number of passes in compiling the source code file into the executable file, the executable file being the last of the successive files. For example, the source code instructions in the source code file are compiled into an executable file, and the executable file, which includes machine code, is then executed by the processor. Examples of compiled programming languages include FORTRAN, C, Pascal, and COBOL.

Obfuscation is the intentional or coincidental altering of compiled or interpreted binary or intermediate object code in such a way as to prevent reverse engineering. With compiled languages that through multiple passes of compilers and linkers directly produce binary components optimized for speed or size, obfuscation is a natural by-product of the process in that the intelligence embedded into the compiler and linker is intended to produce a binary result that is improved upon (and therefore different from) the original source code. Code that is compiled to an intermediate product that must communicate with, or be compatible with, intermediate products compiled from other languages (such as the Microsoft .Net languages) tend to be more difficult to obfuscate, and therefore also easier to reverse engineer. Intentional obfuscation falls into two categories. The first, used most often with plain text script languages that are not compiled and therefore cannot be effectively protected from the serious examiner, are intended to dissuade and frustrate the casual observer from understanding the intent and flow of the source code. The second form of obfuscation is more sophisticated and is intended to trip up reverse-engineering software, tools, and techniques most commonly deployed against compiled software. References to obfuscation herein are general to the second form, In an interpreted programming language, in various aspects, a source code file containing a multiplicity of source code instructions expressed in the interpreted computer language is executed by the processor. In executing this source code file, each source code instruction of the interpreted computer language is translated into machine code instruction(s) sequentially by an interpreter as the source code instructions are executed by the processor. In some aspects, the source code file of the interpreted programming language may be compiled into an intermediate bytecode file and then intermediate bytecode file is interpreted into machine code sequentially by an interpreter as the bytecode is executed. Examples of interpreted programming languages may include .Net framework languages, Java, Python, BASIC, C#, smalltalk, and mathlab (m-code), and other script languages. Note that the distinction between interpreted programming language and compiled programming language is a matter of implementation and not a fundamental property of the language. Certain programming languages, BASIC for example, may be available as both a compiled programming language and as an interpreted programming language. Also note that the term script may be used interchangeably with interpreted computer language in this disclosure.

Both the source code instructions of a compiled computer language and the source code instructions of an interpreted computer language are human readable, so that a human may access algorithms expressed in source code instructions in compiled computer language and source code instructions in interpreted computer language. Accordingly, source code instructions whether in compiled computer language or interpreted computer language may be regarded as insecure.

While it may be possible for a human to read and understand individual machine code instructions of an executable file resulting from the compilation of a multiplicity of source code instructions expressed in a compiled programming language, it is not usually possible, in various aspects, for either human or a human with the assistance of a computer to ascertain the algorithm being expressed in the machine code of an executable file particularly an executable file resulting from a multi-pass optimizing compiler with obfuscation. Furthermore, it is not possible, with perhaps some exceptions, to decompile the executable file back into the source code instructions from which the source code file was compiled. A reverse compiler cannot restore the original human-readable names of functions and variables for natively compiled code such as unmanaged C++. The reverse compiler cannot restore expanded macros to their unexpanded states. The reverse compiler cannot generally unwind loop optimizations or restore relocated code elements to their original locations. Reverse compilers cannot generally restore work done by preprocessor program instructions, or certain language keywords that instruct the compiler to modify stack processing order or the return stack from function calls. Inline code, precompiled libraries bound into code in their binary form, and iterative functions are very difficult for reverse compilers to restore to their original source code form.

Therefore, it is considered that an algorithm, once expressed as an executable file compiled by a multi-pass compiler with obfuscation from source code instructions written in compiled computer language, cannot be reverse engineered into its underlying source code instructions and the algorithm then determined from the source code instructions. Accordingly, neither the source code instructions nor the algorithm may be ascertained from the executable file. Because the algorithm may not be ascertained from the executable file, the algorithm when expressed as an executable file may be regarded as secure. Use of a multiple pass compiler with optimizations to compile the executable file from the source code file may make the executable file particularly difficult to reverse compile and thus the executable file may be regarded as particularly secure.

An intermediate bytecode file may be decompiled into a corresponding set of interpreted language source code instructions, and the algorithm may be ascertained from these interpreted language source code instructions. Accordingly, algorithms expressed either as a set of interpreted language instructions can be ascertained from the set of interpreted language instructions or by de-compilation of the bytecode file, if any, into the corresponding set of interpreted language instructions. Because the algorithm can be ascertained directly from the interpreted language instructions or by de-compilation of the bytecode file into interpreted language instructions, the algorithm is insecure when expressed as a set of either interpreted language instructions or as a bytecode file.

Developer, as used herein, refers to, for example, the maker, software house, developer, or producer of the target software, which is the software targeted for protection by the software management apparatus disclosed herein. The developer may have intellectual property rights in the target software. As used in this disclosure, developer may refer to the entity (person or organization) that develops the target software that is protected by the software management apparatus. End user, as used herein, may refer to a purchaser or other authorized entity that differs from the developer and that is legally in possession of the target software and in compliance with the developer's intellectual property rights in the target software, in various aspects. The end user may obtain the target software either directly or indirectly from the developer. End user may refer to, for example, an organization, a group, or an individual, or combinations thereof, in various contexts. For example, end user may refer to an actual user of the target software, to a system administrator who manages the target software, or both. Intermediary, as used in this disclosure may refer to an individual or organization interposed between the developer and the end user. The intermediary may be, for example, a reseller or may be some managerial/administrative entity within an organization. In the latter case, for example, the developer may be a research group within a corporation, the end user may be an applied engineering group within the corporation, and the intermediary may be some managerial or administrative entity within the corporation that bridges between the research group and the applied engineering group.

In various aspects, the target software may control a device—say, a refrigerator running Linux, as Samsung and GE refrigerators do now. The digital asset may be thought of as encompassing both the software and the device that the software controls. For example, a rental company may use AMULET control over the target software to evaluate the environment of the device against the AMULET to run only if 1.) not moved from an authorized location, and 2.) if monthly rent were up to date, and 3.) if certain components were not removed from the device, and 4.) if certain maintenance was performed regularly, and 4.) if the occasional phone home was successful. Items purchased by a consumer could be protected from theft the same way—sort of a universal Lojack for everything. This concept may be further extendable to process controls at, for example, oil refineries, nuclear power plants, air traffic control systems, and electrical power distribution systems.

The digital asset may be data. For example, e-mails archived as individual AMULET protected assets would be unreadable. As another example, a movie (or other video or audio data file) may be protected by dividing the movie into 1000, 5000, or 10,000 individual AMULET protected pieces. Such as AMULET protected movie may be playable only under the conditions dictated by the movie studio. In addition to providing a complete set of criteria as to the circumstances in which the data may be accessed, the AMULET for the data may require, for example, that the "print screen key" and memory clipboard are disabled, known screen capture utilities such as Snagit are not be present, and that network connectivity is appropriately restricted. When, for example, the encrypted image is rendered for viewing, the AMULET ID for the Certitude configuration file, the item AMULET associated with the image, the time, date, and host machine time zone, and if available, the GPS coordinates at the time of rendering may be imbedded invisibly into the displayed image in several locations and in several forms, using steganography, direct coded pixel placement (similar to a watermark, but not visible), and other techniques, such that the subtle differences in the displayed image when compared binarily to the original image can be used to retrieve the embedded information. Most importantly, at the time of rendering the signed in user, computer identification, and various other pieces of information useful for audit trailing are forwarded to the connected server (and stored on the device as well). In this manner, various forms of unauthorized duplication may be prevented, and any previously secured image that is now in the wild is identified, along with locked-down audit trailing to identify the source, location, and person responsible for the unauthorized activity once that activity has been discovered.

Unauthorized user, as used herein, refers, for example, to a party that may not be in legitimate possession of the target software or who wishes, for example, to copy the target software without authorization, steal, hack, utilize outside the scope of a licensing agreement, or otherwise circumvent the developer's intellectual property rights in the target software. Unauthorized user may include, for example, include hackers, spies, vandals, thieves, trespassers, extortionists, the depraved, and the malicious.

Although various illustrative examples and various discussion within this disclosure may be directed at implementations within the Window operating system, it should be understood that the apparatus, methods, and compositions of matter disclosed herein may be used with various other operating system or combination of operating systems, such as, for example, MAC OSX, Unix, Linux, Android, or iOS. While C++ may be cited, such citations to C++ are exemplary not restrictive, and other compiled computer languages may be substituted for or combined with C++.

FIG. 1 illustrates an implementation of software management apparatus 10. As illustrated in FIG. 1, software management apparatus 10 includes process 20, lease manager 30, config.file 40, control module 63, and tool 90. Process 20, as illustrated, represents a digital asset in the form of target software 15 in execution as protected by portions of software management apparatus 10. Process 20, as illustrated, is the digital asset protected by software management apparatus 10. Process 20 includes functions 21, 23, 29 and function 25, in this implementation. A developer may control the formation of target software 15, and an end user may obtain the process 20 from the developer along with various other portions of software management apparatus 10. Target software 15 represents the developer's unprotected code from which the developer selects function 25 for lease managed protection.

Process 20, in this implementation, includes functions 21, 23, 29, and process 20 may include various numbers of functions, such as functions 21, 23, 29, in various other implementations. Function, as used herein, includes, for example, modules, functions, subroutines, library routines, DLL's, and other operable software units. Functions 21, 23, 29 as well as various other portions of process 20 excepting function 25 may be written in interpreted programming language(s), and, thus, functions 21, 23, 29 as well as various other portions of process 20 excepting function 25 may be generally regarded as insecure.

Function 25, in this implementation, forms at least a portion of process 20. Function 25 is formed by compilation of function 19, so that function 25 has the form of as an executable file with instructions in machine code. Function 19 may be written in interpreted computer language(s). Function 25 may, in various aspects, be formed from the function 19 using a translator that transforms the interpreted computer language of function 19 into a compiled computer language followed by compilation using a multi-pass compiler with optimizations and obfuscation. Accordingly, function 25, including algorithm(s) contained within function 25, may be regarded as secure, in this implementation.

Function 25 communicates with lease manager 30, in this implementation. Lease manager 30 determines the logical value of LEASE (LEASE=TRUE or LEASE=FALSE) using config.file 40, and lease manager 30 communicates the logical value of LEASE to function 25 of process 20. In FIG. 1, the If (LEASE=TRUE) Then statement implies a call to lease manager 30. Lease manager 30 is implemented as an executable file formed from multi-pass compilation and obfuscations of a source code file, so that lease manager 30 is regarded as secure, in the illustrated implementation. Communication between lease manager 30 and function 25 of process 20 including the logical value of LEASE from lease manager 30 to function 25 may be regarded as secure.

TABLE 2

EXEMPLARY CONTROL LOGIC AND CONTROL PARAMETERS

If the system time falls within a specified time range then LEASE = TRUE else LEASE = FALSE.
A specified process_name for process 20. If lease manager 30 is called from process 20 having process_name then LEASE = TRUE else LEASE = FALSE.
If lease init request to lease manager 30 is from process 20 having process_name then LEASE = TRUE if subsequent lease requests to lease manager 30 are from process 20 having process_name else LEASE = FALSE.
If function 25 is first invoked in child thread having thread_id then LEASE = TRUE if subsequent invocations of function 25 are from thread_id else LEASE = FALSE
If specified end user is logged into computer (for example, as known to an Active Directory or Windows NT authentication system) then LEASE = TRUE else LEASE = FALSE,
If end user is a member of an authentication group then LEASE = TRUE else LEASE = FALSE
If function 25 has been invoked less than or equal to N times (where N is some selected positive integer) then LEASE = TRUE and if function 25 has been invokes more than N times then LEASE = FALSE
If request for function 25 comes from a specific executable file, OCX file, module, or DLL, then LEASE = TRUE else LEASE = FALSE.
If request for function 25 comes from a specific executable file, OCX file, module, or DLL, then LEASE = FALSE else LEASE = TRUE.
If request for function 25 comes from a specific executable file, OCX file, module, or DLL having a specific checksum value then LEASE = TRUE else LEASE = FALSE.
If request for function 25 comes from an executable file, OCX file or DLL having a specific file extension and file size then LEASE = TRUE else LEASE = FALSE.
If request for function 25 occurs within a specified time of another request for function 25 then LEASE = FALSE else LEASE = TRUE.
If request for function 25 occurs within a specified time of another request for function 25 then LEASE = TRUE else LEASE = FALSE.
If request for function 25 comes from an executable file, OCX file, or DLL residing in a specific disk directory then LEASE = TRUE else LEASE = FALSE.
Preventing the return code of a requested function from being passed back to the caller if that return is, or alternatively, is not in a specified range of values.
If one or more of the parameter values passed with function 25 falls within a specified range then LEASE = TRUE else LEASE = FALSE.
If system time falls within specified days of the week, specified days of the month, specified times within a day, then LEASE = TRUE else LEASE = FALSE.
If the computer's BIOS resource tag matches a specified tag then LEASE = TRUE else LEASE = FALSE.
If the computer's host name matches a specified name then LEASE = TRUE else LEASE = FALSE.
If the computer's IP address matches a specified range of IP addresses then LEASE = TRUE else LEASE = FALSE.
If the computer's MAC address matches a specified MAC address then LEASE = TRUE else LEASE = FALSE.

The logical value of LEASE controls the execution of segment 27 within function 25. If LEASE=TRUE as determined by lease manager 30, then function 25 executes one or more algorithms within segment 27 of function 25 that is controlled by the If LEASE=TRUE condition 26, as illustrated in FIG. 1. If LEASE=FALSE as determined by lease manager 30, then function 25 will not execute the one or more algorithms of segment 27 within function 25, as illustrated in FIG. 1.

Config.file 40 may be written in Extensible Markup Language (XML) and config.file 40 includes AMULET 50, in the FIG. 1 implementation. AMULET 50 is formed as an XML file with hexadecimal content, in the example presented in Table 1. Note that a portion of the exemplary AMULET 50 is omitted for the sake of brevity as indicated by the . . . in Table 1.

TABLE 1

EXEMPLARY AMULET

<?xml version="1.0"?>
<STLSApplication name="Registration">
    <Key>0DE5001DAE17CD5889C14B28CFECD9965DB20F37577EC8946638E24ECDDE9A1
6A0D412E379C917B3BC13F4973CADDDAC8A23D7D06D4050DB81512E25C96119438249FE534D
70592F9DF2C4036AB08F78367918050C368D2C7E353F48923F9C81811C0FC535A08274849071B5
A41B0569FFB71AA8D5156F7E070EDD7403466478EF6F8D2BAC7A395D9F2AF59CBC3A917E0905
2AE0C745EFE841......... EF8FA5B026A0D36D0F252CA7DD567D0F87D7A1BEBE</Key>
</STLSApplication>

AMULET ID 53, which is a globally unique ID (GUID), control logic 55 with control parameters 56, is embedded within AMULET 50 in encrypted form. Lease manager 30, in this implementation, accesses config.file 40 to determine the logical value of LEASE. Lease manager 30, as illustrated, decrypts AMULET 50 of config.file 40 to obtain AMULET ID 53, control logic 55 with control parameters 56, and lease manager 30 may use AMULET ID 53, control logic 55 with control parameters 56, or various combinations of AMULET ID 53, control logic 55 with control parameters 56 to determine the logical value of LEASE.

The logical value of LEASE may be determined, at least in part, by lease manager 30 using AMULET ID 53. For example, lease manager 30 may compare AMULET ID 53 with AMULET ID 61, which is passed to lease manager 30 from process 20. In this implementation, a match of AMULET ID 53 with AMULET ID 61 indicates, at least in part, that LEASE=TRUE, while no match of AMULET ID 61 with AMULET ID 53 indicates LEASE=FALSE.

The logical value of LEASE may be determined, at least in part, by lease manager 30 using control logic 55 in combination with control parameters 56. Some examples of control logic 55 with control parameters 56 are listed in Table 2. Note that lease manager 30 may use various combinations of control logic and control parameters, such as the exemplary control logic 55 and control parameters 56 listed in Table 2, to determine the logical value of LEASE. Control logic 55 may be linked by Boolean or other logical operators, for example AND or OR, or combinations of Boolean or other logical operators, in various implementations, to determine the logical value of LEASE. Also, note that the exemplary control logic 55 in Table 2 may be reversed, in various implementations. For example, exemplary control logic 55 {If the system time falls within a specified time range then LEASE=TRUE else LEASE=FALSE} may be reversed into control logic {If the system time falls within a specified time range then LEASE=FALSE else LEASE=TRUE}. Per this example, control logic 55 corresponds to the logical statement {If the system time falls within a specified time range then LEASE=TRUE else LEASE=FALSE}, and the control parameter 56 corresponds to "specified time range."

The developer may choose to allow an intermediary or the end user to control the execution of segment 27 of function 25 by selection of appropriate control logic 55 and control parameters 56, in this implementation. Control module 63 implements control by the intermediary or by the end user, in this implementation. Using control module 63, the intermediary, the end user, or both the intermediary and the end user may use control module 63 to create optional AMULET 57 with AMULET ID 58 and control logic 59 and control parameters 60. Control module 63 may be in the form of a DLL, in various implementations, and control module 63 may access various tools of software management system 10 that create AMULET(s) and implement control logic, such as control logic 55, 59, and control parameters, such as control parameters 56, 60.

If allowed by the developer, the intermediary may use the control logic 59 and control parameters 60 of optional AMULET 57 to control the execution of segment 27 within function 25 to allow the intermediary to grant selected capabilities of process 20 to selected end users. For example, the end user may allow only those end users who have paid additional fees to execute segment 27 of function 25.

If allowed by the developer, the end user may use the control logic 59 and control parameters 60 of optional AMULET 57 to control the execution of segment 27 within function 25 in order to control the deployment of process 20 within the end user's organization. For example, the end user may allow only those end users at a specified location, within a particular group, or at a specified level within the organization to execute segment 27 of function 25. The end user may wish to restrict to execute segment 27 of function 25 to particular times of the day (no use after normal working hours, for example) or of the week (no weekend use, for example).

Control logic 59 and control parameters 60 may be similar in logical structure to control logic 55 and control parameters 56, so that Table 2 provides examples of control logic 59 and control parameters 60. However, control logic 59 and control parameters 60 imposed by intermediary or end user may only be more restrictive than control logic 55 and control parameters 56 imposed by the developer. The intermediary and the end user can only further restrict the execution of segment 27 within function 25 in addition to the restrictions imposed by the developer. The intermediary and the end user are not allowed to either loosen the restrictions imposed by the developer on the execution of segment 27 within function 25 or to circumvent the restrictions imposed by the developer on the execution of segment 27 within function 25.

Lease manager 30 may use end user control AMULET ID 58 portion of optional AMULET 57 to determine, at least in part, the logical value of LEASE. Lease manager 30 may make a comparison of compare AMULET ID 58 with a corresponding AMULET ID that is passed to lease manager 30 from process 20. A match indicates, at least in part, that LEASE=TRUE, while a failure to match indicates LEASE=FALSE. The lease manager 30 may determine the logical value of LEASE at least in part, using control logic 59 in combination with control parameters 60 that are embedded within optional AMULET 57.

Tool 90 may allow the developer to select function 19 including segment 27 of target software 15, to bound segment 27 within If LEASE=TRUE condition 26. Tool 90 may form function 25 by compilation of function 19 including segment 27 within If LEASE=TRUE condition 26 so that function 25 comprises an executable file with instructions in machine code. Tool 90 may allow the developer to create config.file 40 including AMULET 50 with AMULET ID 53, control logic 55, and control parameters 56. Tool 90, as illustrated, allows the developer to select control logic 55 and control parameters 56, and to choose to allow an intermediary or the end user to control the execution of segment 27 of function 25 by selection of appropriate control logic 55 and control parameters 56. Tool 90 may allow the developer to create an install package to install, for example, process 20 including function 25, lease manager 30, config.file 40, and control module 63 onto the computer of the end user.

Figure 2:
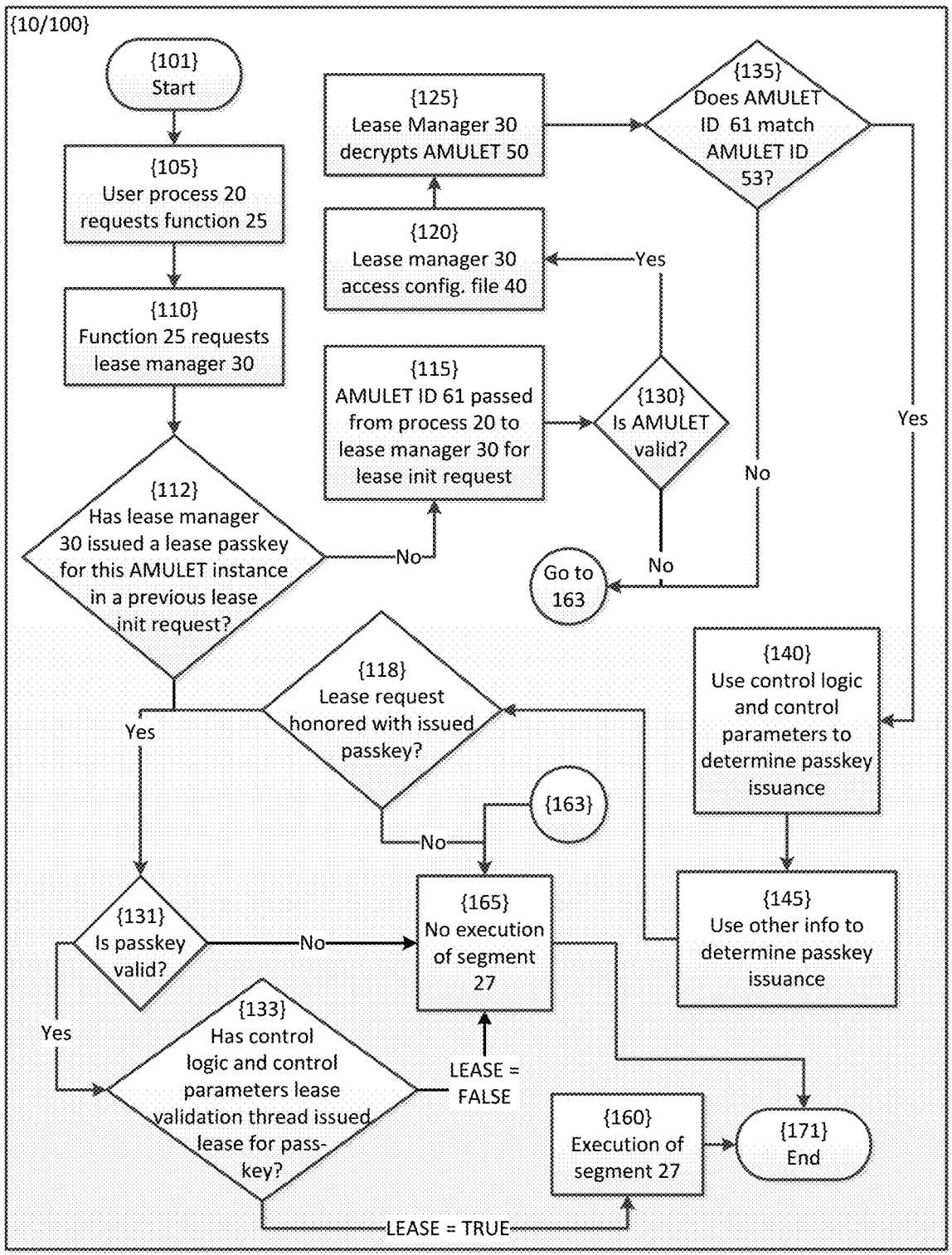
FIG. 2 illustrates by process flow chart exemplary operations of the exemplary software management apparatus of FIG. 1.

In operation, exemplary software management apparatus 10 may implement exemplary method 100, as illustrated in FIG. 2. As illustrated in FIG. 2, method 100 is entered at step 101 and then proceeds from step 101 to step 105. At step 105, process 20 requests function 25. At step 110, function 25 then requests lease manager 30 to determine the logical value of LEASE. Lease manager 30 determines the logical value of LEASE and then passes the logical value of LEASE to function 25.

At step 112, the lease manager 30 checks for an issued passkey for this AMULET. If no at step 112, method 100 passes from step 112 to step 115. At step 115, process 20 passes AMULET_ID 61 from process 20 to lease manager 30. AMULET_ID 61 may be embedded within function 25, and AMULET_ID 61 may be passed from function 25 to lease manager 30 as function 25 requests lease manager 30 per step 110. In other implementations, AMULET_ID may be otherwise accessed by process 20 and then passed from process 20 to lease manager 30.

At step 130, the validity of the AMULET is checked by lease manager 30. If the AMULET is valid, lease manager 30 access confi.file 40, at step 120. Then the lease manager 30 decrypts AMULET 50, which is embedded within confi.file 40, at step 125. At step 135, the lease manager 30 checks for a match of AMULET_ID with AMULET_ID 53. If, AMULET_ID matches AMULET_ID 53, method 100 passes from step 135 to step 140. At step 140 lease manager 30 uses control logic 55 in combination with various control parameters 56 to determine passkey issuance. If the control logic 55 and control parameters 56 are satisfied at step 140, a passkey is issued.

Method 100 proceeds from step 140 to step 145. At step 145, lease manager 30 uses use optional control logic 59 and control parameters 60 of optional AMULET 57 to determine passkey issuance. At step 145, lease manager decrypts optional AMULET 57 and checks the validity of optional AMULET 57. Then, at step 145, lease manager 30 compares AMULET ID 58 with a corresponding AMULET ID passed to lease manager 30 from process 20 to determine passkey issuance. Finally, at step 145, lease manager 30 uses control logic 59 in combination with various control parameters 60 to determine passkey issuance. An invalid AMULET 57, failure of the comparison of AMULET ID 58 with the corresponding AMULET ID passed to lease manager 30 from process 20, or failure to satisfy control logic 59 and control parameters 60 will result in no passkey being issued. If the control logic 59 and control parameters 60 are satisfied at step 145 along with valid AMULET 57 and satisfaction of the comparison of AMULET ID 58 with the corresponding AMULET ID passed to lease manager 30 from process 20, then the passkey is issued.

Method 100 passes from step 140 to step 118 where the method checks to see if the lease request should be honored with an issued passkey. If the passkey request is not honored, method 100 advances from step 118 to step 165.

If the AMULET is not valid at step 130 or if AMULET_ID 61 does not match AMULET_ID 53, method 100 advances from steps 130, 135, respectively to connection point 163 and then to step 165.

At step 165, there is no execution of segment 27 as LEASE=FALSE. Method 100 passes from step 165 to step 171 and terminates.

If lease request is honored with an issued passkey, method 100 advances from step 118 to step 131. Method 100 also proceeds to step 131 from step 122 if lease manager 30 has issued a passkey for this AMULET in a previous lease init request.

At step 131, method 100 checks for validity of the passkey. If the passkey is not valid at step 131, method 100 proceeds from step 131 to step 165, which results in no passkey, LEASE=FALSE, and thus no execution of segment 27.

At step 133, if the passkey is valid, lease manager 30 checks control logic 55 in combination with various control parameters 56 to determine short-term lease identifier issuance. Lease manager 30 checks control logic 59 in combination with control parameters 60 to determine short-term lease identifier issuance. If both control logic 55 with control parameters 56 and control logic 59 with control parameters 60 are satisfied at step 133 a short-term lease identifier is issued, and method 100 advances from step 133 to step 160.

At step 160, the short-term lease identifier has been issued, LEASE=TRUE, and segment 27 is allowed to execute. Method 100, passes from step 160 to step 171 and terminates. A "passkey" is an indicator that the lease init request has been honored; the "short-term-lease identifier" indicates that all requisite runtime conditions have been tested and satisfied to allow this lease to be honored for some time period.

If either control logic 55 with control parameters 56 or control logic 59 with control parameters 60 are not satisfied at step 133, no short-term lease identifier is issued, LEASE=FALSE, and method 100 advances from step 133 to step 165.

Figure 3:
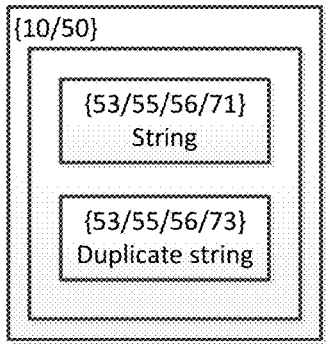
FIG. 3 illustrates by schematic diagram an exemplary AMULET as used by the exemplary software management apparatus of FIG. 1.

As depicted in FIG. 3, exemplary AMULET 50 includes string 71, and string 71 includes AMULET_ID 53, control logic 55, and control parameters 56. Duplicate string 73, as illustrated, is a duplicate of string 71, so that duplicate string 73 matches string 71. String 71 may be encrypted and duplicate string 73 may be encrypted using different encryption methods, and string 71 may be interwoven with duplicate string 73 at one or more stages of encryption of AMULET 50.

Figure 4:
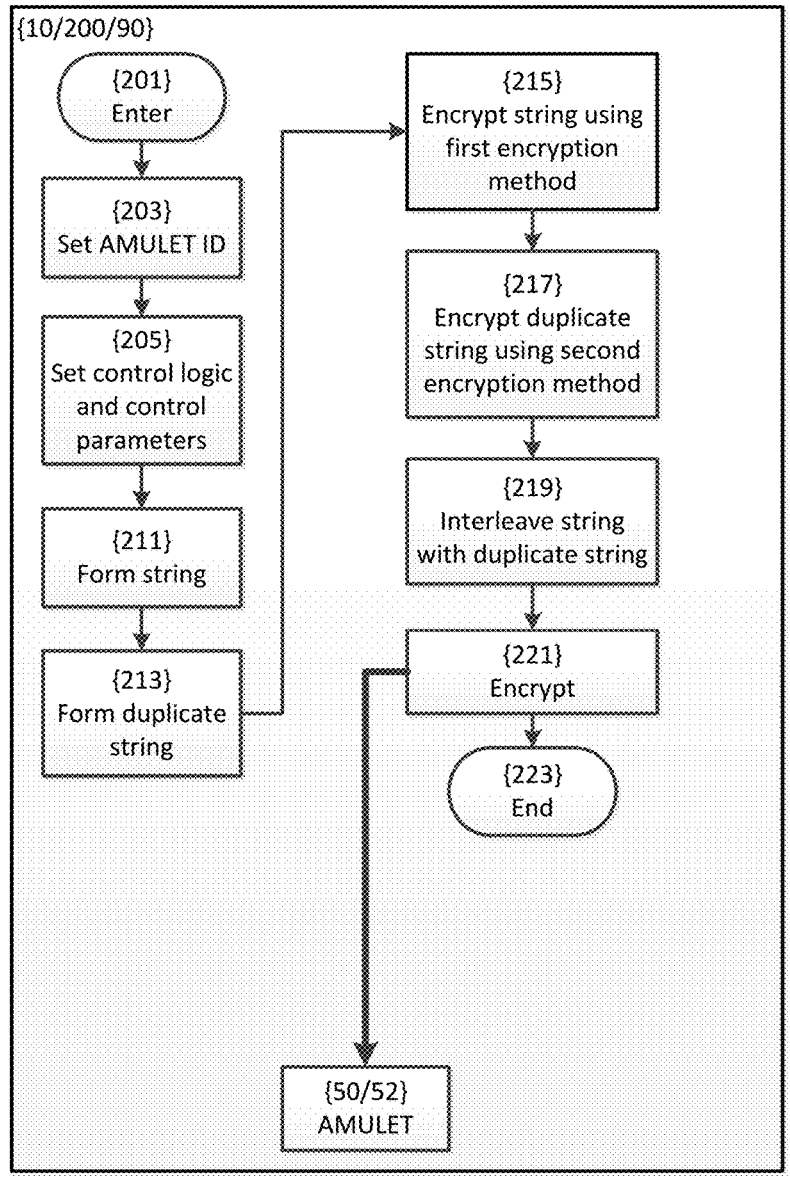
FIG. 4 illustrates by process flow chart an exemplary formation of the exemplary AMULET of FIG. 3.

Accordingly, AMULET 50 may be formed according to the exemplary method 200 illustrated in FIG. 4. As illustrated in FIG. 4, method 200 may be entered at step 201. At step 203, the developer may set the AMULET_ID 53 by choosing the AMULET_ID 53. The developer may set control logic 55 and control parameters 56 at step 205 by selecting the control logic 55 and the control parameters 56 which are comprised of all of the control settings and control parameters possible or appropriate for AMULET 50. Examples are provided in Table 2. The developer may select control logic 55 and control parameters 56 that allows the intermediary, the end user, or both the intermediary and the end user to set control logic 59 and control parameters 60 that further controls the execution of segment 27 of function 25.

At step 211, AMULET_ID 53, control logic 55 and control parameters 56 are formed into string 71. Duplicate string 73, which is a duplication of string 71, is formed from string 71, at step 213.

At step 215, string 71 is encrypted using a first encryption method. At step 217, duplicate string 73 is encrypted using a second encryption method. The second encryption method may differ from the first encryption method, in various implementations.

At step 219, encrypted string 71 is interweaved with encrypted string 73. Bytes of encrypted string 71 and bytes of encrypted duplicate string 73 may be interspersed with one another and encrypted string 71, encrypted duplicate string 73, or both encrypted string 71 and encrypted duplicate string 73 may be transposed at step 219.

The combination of encrypted string 71 interweaved with encrypted string 73 may be encrypted at step 221. AMULET 50 in encrypted form 52 is output from method 200 following step 221. Method 200 terminates at step 223. Note that, for example, steps 219, 221 may be repeated some number of times, in various implementations.

Figure 5:
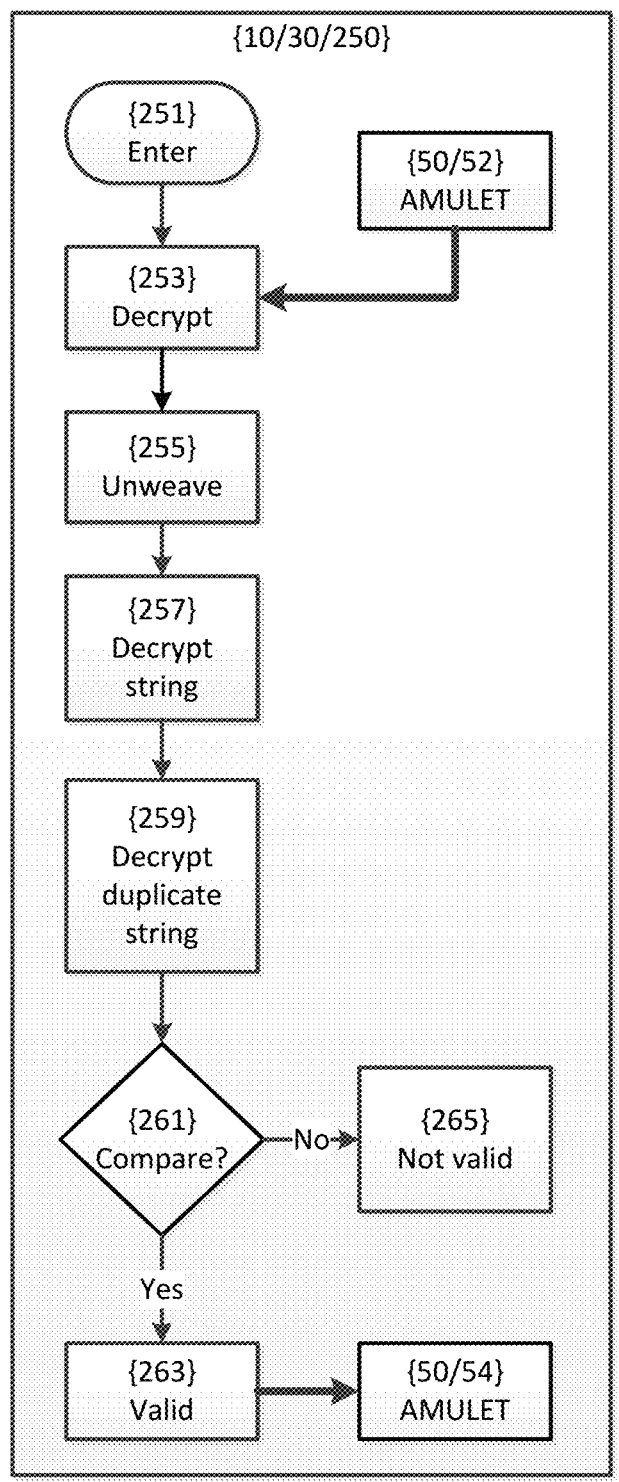
FIG. 5 illustrates by process flow chart an example of the decryption of the exemplary AMULET of FIG. 3.

Lease manager 30 may decrypt AMULET 50 from encrypted form 52 to decrypted form 54 according to exemplary method 250, which is illustrated in FIG. 5. As illustrated in FIG. 5, method 250 is entered at step 251 and AMULET 50 in encrypted form 52 is input into method 250. At step 253, method 250 decrypts AMULET 50 by reversing the encryption of AMULET 50 of step 221 of method 200. At step 255, encrypted string 71 is unwolven from encrypted string 73 by reversal of the weaving process of step 219 of method 200. At step 257, encrypted string 71 is decrypted by reversal of the encryption applied to string 71 by step 215 of method 200. At step 259, encrypted duplicate string 73 is decrypted by reversal of the encryption applied to duplicate string 73 by step 217 of method 200.

String 71 (now decrypted) is then compared with duplicate string 73 (now decrypted) at step 261. If string 71 does not match duplicate string 73 at step 261, method 250 proceeds from step 261 to step 265. Failed match between string 71 and duplicate string 73 at step 261 may indicate tampering, including corruption or other error, with AMULET 50, and step 265 may cause the implementation of error, failure, or other or similar routines in response. At step 265, LEASE=FALSE because of the indication of tampering per the failed match between string 71 and duplicate string 73 at step 261.

If string 71 matches duplicate string 73 at step 261, method 250 proceeds from step 261 to step 263. AMULET 50 is considered valid at step 263 so that LEASE=TRUE. AMULET 50 in decrypted form 54 is output at step 263, and AMULET 50 in decrypted form 54 may be used by lease manager 30 to determine the logical value of LEASE, for example, as generally outlined in method 100 of FIG. 2. Method 250 terminates at step 267, as illustrated in FIG. 5.

Figure 6:
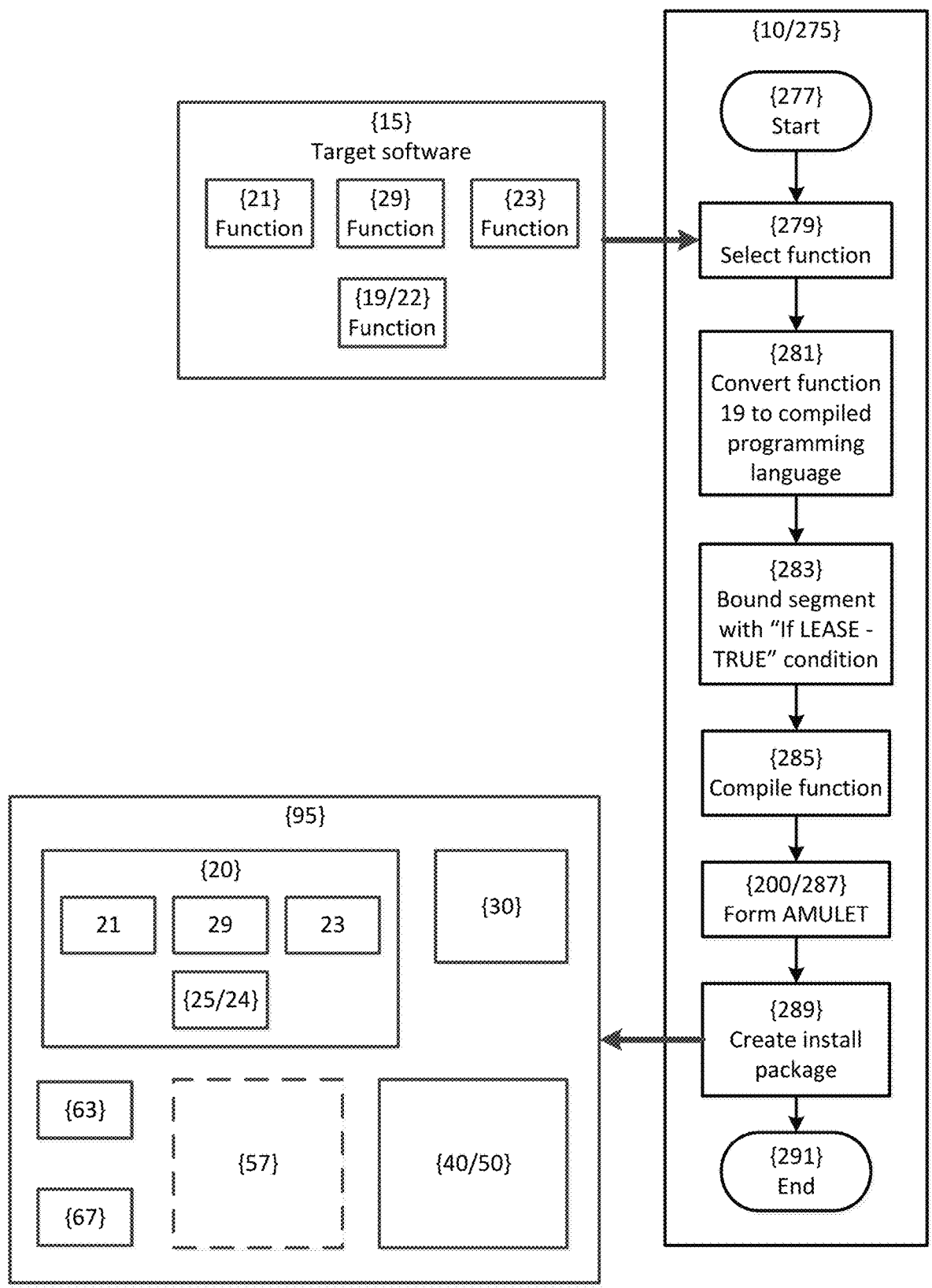
FIG. 6 illustrates by process flow chart exemplary operations of tool of the exemplary software management apparatus of FIG. 1.

FIG. 6 illustrates exemplary method 275 of tool 90. As illustrated in FIG. 6, method 275 begins with step 277, at which target software 15 is input into method 275 of tool 90. Process 20 includes functions 21, 23, 25, 29, and function 19, all of which are written in interpreted computer language 22.

At step 279 the developer may use tool 90 to select one of functions 19, 21, 23, 29, and function 19 is so selected for exemplary purposes. Function 19 may be critical to the operation of process 20 so that process 20 will not operate without function 19, or certain capabilities of process 20 may be embodied in function 19 so that process 20 lacks the certain capabilities when function 19 is inoperable. Function 19 may include one or more proprietary algorithms embedded within segment 27 of function 19. It may be necessary for the developer to create critical function 19 within process 20 by, for example, rewriting at least portions of process 20. Functions 21, 23, 29 may be in the form of interpreted computer language(s) so that the end user may access functions 21, 23, 29, for example, to modify functions 21, 23, 29 to meet the end user's particular requirements.

At step 281, function 19 is converted from the interpreted computer language 22 into a compiled computer language. The developer may select the compiled computer language, at step 281.

At step 283, the developer may select segment 27 of function 19, and bound segment 27 within If LEASE=TRUE condition 26. Segment 27 may be critical to the operation of function 19 so that function 19 cannot execute without execution of segment 27. Note that steps 281 and 283 may be reversed in various implementations. In such implementations, segment 27 is first selected and bound within the LEASE=TRUE condition 26 and then the function 19 is converted from interpreted computer language 22 into the compiled computer language.

At step 285, function 19, which is in the compiled computer language, is compiled into function 25 in machine code 24. The compiler invoked at step 285 may be a multi-pass compiler and may employ obfuscation, and function 25 in machine code 24 may be regarded as secure. In some implementations, the compiler may be included with tool 90, while, in other implementations, tool 90 invokes the compiler as a resource available from the system. Tool 90 may also include a translator that translates interpreted computer language 22 into the compiled computer language. A cross compiler may be employed that compiles function 19 directly into machine code 24 in from interpreted computer language 22.

Method 275 proceeds from step 285 to step 287, and the developer may form AMULET 50 at step 287. Step 287 may incorporate method 200 described in FIG. 4.

At step 289, tool 90 creates an exemplary install package 95. Install package 95, as illustrated in FIG. 6, includes process 20 with function 25 in machine code 24. Install package 95, in this implementation, includes lease manager 30, config.file 40 with AMULET 50, and control module 63. Install package 95 may be ported to the host computer and install package 95 is operational to install process 20 with function 25 in machine code 24 and config.file 40 with AMULET 50. If necessary, install package 95 installs lease manager 30 and control module 63 onto the host computer. Lease manager 30 and module 63 may pre-exist on the end-user's computer as the result of a previous installation, or lease manager 30 and control module 63 may be incorporated in the operating system of the computer, in various aspects, in which case the install package 95 does not install lease manager 30 and module 63.

Figure 7:
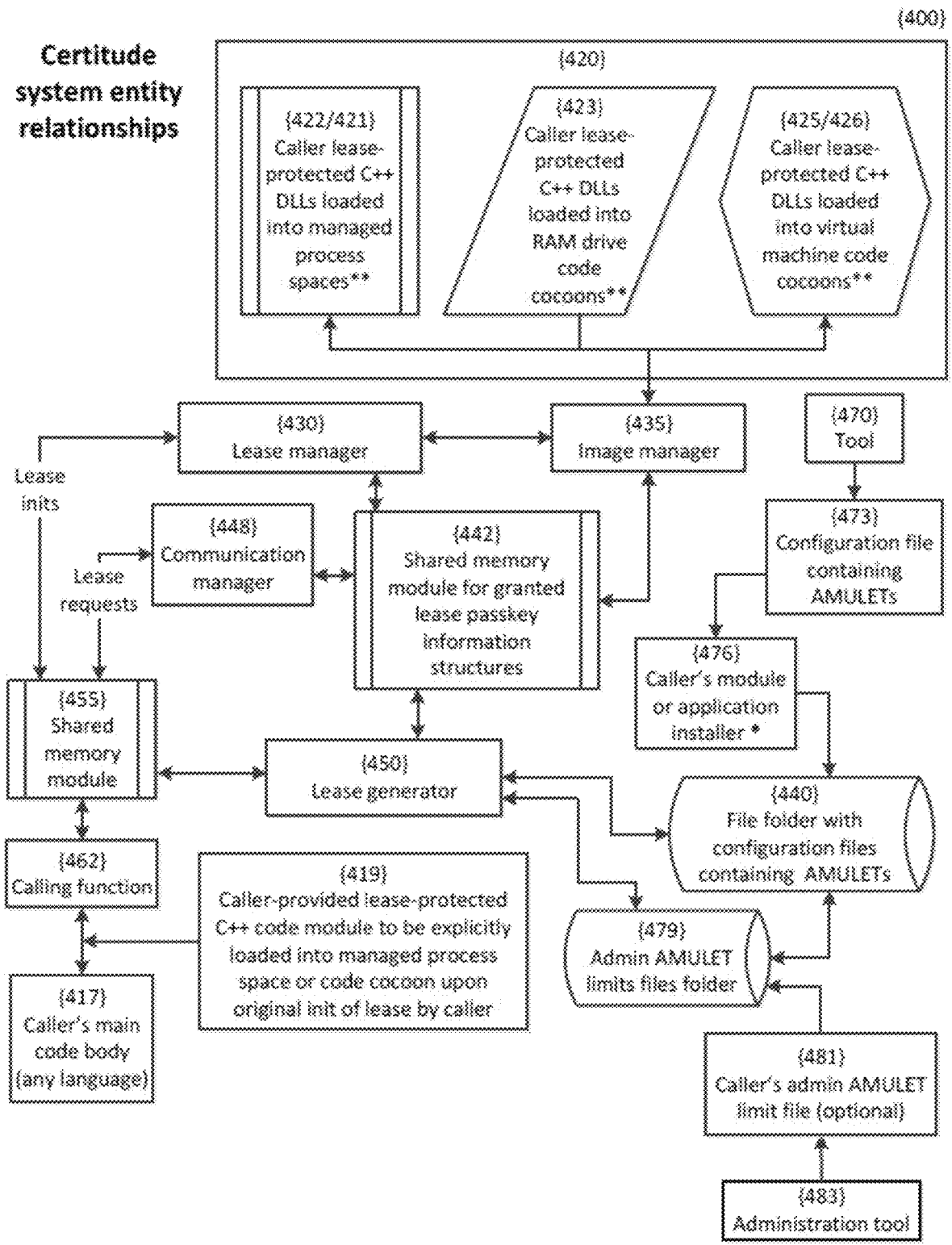
FIG. 7 illustrates by schematic diagram another exemplary implementation of a software management apparatus.

FIG. 7 illustrates another implementation of software management apparatus 400. As illustrated in FIG. 7, software management apparatus 400 includes lease manager 430, image manager 435, lease generator 450, and communications manager 448. Lease manager 430 controls various components of software management apparatus 400, in this exemplary implementation. Lease manager 430 grants permission to honor passkey 610 associated with a lease request from lease protected function 419, which may be executing as function 421, 423, 425, in this illustrated implementation. Leases may be valid for a specified time, and may be continually renewed to support lease requests from lease protected function 419 over time periods greater than the specified time.

Lease manager 430 provides the initial contact point for function 419 of process 420 as function 419 initialize leases (makes lease init request) or make lease requests. Lease init request refers to the initial lease request made by, for example, calling function 462 embedded within function 419 during execution of process 420. The lease init initializes the lease. Lease request refers to subsequent lease requests made by calling function 462 to verify the lease following the lease init request during execution of process 420.

Lease manager 430, in this implementation, is the primary control module for software management apparatus 400. Only one software management apparatus 400 including lease manager 430 exists on a host computer, in this exemplary implementation, and software management apparatus 400 is capable of servicing any number of processes, such as process 420, making lease init requests and lease requests.

Lease manager 430, in this implementation, provides initial security services (caller validation), protection against denial-of-service attacks, dispatches units of work to other components of software management apparatus 400, provides audit tracking, system health and performance monitoring for the software management apparatus 400, scales the number of copies of software management apparatus 400 components instantiated in memory as demand for services rises and falls, manages software management apparatus 400 configuration changes in real time, and, when possible, reconstitutes any damaged data or software management apparatus 400 components from encrypted backup storage as necessary. To accomplish this in addition to its transaction managing and message, acceptance, audit, and other duties, lease manager 430 may mount a number of dedicated-purpose threads, as well as a thread to monitor and repair the threads.

Image manager 435, in this implementation, controls mounting, managing, monitoring, pooling, restoring, and/or tearing down process spaces, such as process space 422, RAM drive code cocoons, such as RAM drive code cocoon 424, or virtual machine code cocoons, such as virtual machine code cocoon 426, necessary to support any valid lease init requests once the first lease request has been made. Image manager 435 manages the process memory under the control of software management apparatus 400 used to provide process space 422, RAM drive code cocoon 424, or virtual machine code cocoon 426.

Image manager 435, in various implementations, mounts a number of dedicated-purpose threads, as well as a thread to monitor and repair the threads themselves should there be an error. One dedicated process thread of exemplary image manager 435 is devoted to monitoring the shared memory module 455 where lease generator 450 stores granted lease passcodes structures, scanning shared memory module 455 for any honored lease init requests that require RAM drive code cocoon 424 or virtual machine code cocoon 426.

Another dedicated process thread of image manager 435, in various implementations, looks for damaged or expired process space 422, RAM drive code cocoon 424, or virtual machine code cocoon 426, repairing or removing process space 422, RAM drive code cocoon 424, or virtual machine code cocoon 426, as necessary. Another dedicated process thread of image manager 435, in various implementations, defragments memory and looks for process space 422, RAM drive code cocoon 424, or virtual machine code cocoon 426 sharing/pooling opportunities.

Lease generator 450 approves or denies lease init requests and lease requests, decrypts and interprets AMULET(s) and determines whether a given lease request is valid (prequalifying when possible and appropriate), and if valid, producing the granted lease request passcode structures to store in shared memory, such as memory module 442, 455. Lease generator 450 monitors folder 440 of software management apparatus 400 for the arrival, removal, or modification of AMULET config.files and admin AMULET limit files upon process 420 installation or startup. Lease generator 450 may provide status information stacks on its own behaviors and performance for communication manager 448.

Lease generator 450, in various implementations, mounts a number of dedicated process threads to check for the arrival of new lease init requests and lease requests, to check for new, modified, or deleted config.files and optional admin AMULET(s), and to process AMULET(s) for rule satisfaction and to pre-process or remove any config.files and changes in optional admin AMULET(s). Lease generator 450 may mount a thread to monitor and report on its own behavior.

Target software 417 represents the developer's unprotected code from which the developer selects function 419 for lease managed protection. In execution, target software 417 is designated as process 420, in this illustrated implementation.

Function 419 is written by the developer using elements selected by the developer that the developer wishes to lease-protect, for example, as unmanaged C++ functions in a compiled DLL using function calling function 462 for lease init request and request services from the software management apparatus 400.

Calling function 462 is incorporated into function 419 to make lease init requests and lease requests. Function 419 is a portion of process 420 protected with an AMULET-based lease. Function 419 may be selected and then written, for example, as an unmanaged C++ DLL. Function 419 incorporates calling function 462 to make the lease init request and lease requests for lease protected function 419. Function 419, in FIG. 7, represents that block of custom lease-protected unmanaged C++ code residing in the caller-generated DLL. The location of function 419 is passed as a parameter of the lease init request to the communication manager 448 via the shared memory lease init request data structures in 455 by the function 462. Function 419 will be encrypted (if not encrypted already) and passed as function 421 into process space 422, or passed into code cocoon 424 as function 423, or passed into virtual machine code cocoon 426, depending upon the AMULET instructions decoded from the AMULET config.file by lease generator 450.

When calling function 462 embedded within function 419 makes a lease init request during execution of process 420, the lease init request from calling function 462 is posted to shared memory module 455, and lease generator 450 then obtains the lease request from shared memory module 455. Prompted by the lease inti request, lease generator 450 accesses the corresponding AMULET in file folder 440. Lease generator 450 obtains control logic and control parameters from the AMULET and then posts the control logic and control parameters to shared memory module 442. Lease generate 450 then posts the status of the lease init request and the associated passkey (if the passkey was not suggested in the lease init request) to shared memory module 455.

Prompted by the posting of control logic and control parameters as a result of a lease init request to shared memory module 442 by lease generator 450, image manager 435 then transfers function 419 into process space 422 as function 421, into RAM drive code cocoon 424 as function 423, or into virtual machine code cocoon 426 as function 425, as directed by the control logic and control parameters defined in the AMULET associated with the leas init request. Image manager 435 may monitor process space 422, RAM drive code cocoon 424, or virtual machine code cocoon 426 during execution of process 420, and image manager 435 may tear down process space 422, RAM drive code cocoon 424, or virtual machine code cocoon 426, for example, upon termination of process 420.

Function 421 constitutes a part of process 420 (i.e. subroutine, function, etc.) and function 421 may be called during execution of process 420. Function 421 is protected with an AMULET-based lease, the function is expressed in machine code compiled from a compiled computer language. The machine code of function 421 results from multi-pass compilation of the source compiled language code, and the compilation may employ obfuscation. Function 421 in machine code may be regarded as secure. Process space 422 represents one or more areas of memory managed by image manager 435, and function 421 can optionally execute within process space 422 when compiled as an executable file, otherwise function 421 runs in the process space of the caller. When executed in process space 422, the location of function 421 will be passed to the lease init function 115 as one of the control parameters contained in AMULET 50, along with the locations of any input file(s) and the destination location(s) of any output file(s). By running lease-protected function 421 of process 420 in software management apparatus 400 from process space 422 of software management apparatus 400 rather than from process space of process 420, an additional level of protection may be afforded. Encrypted function 421 may be copied into hard drive space managed by software management apparatus 400 and then loaded into process space 422 managed by software management apparatus 400 as needed.

Function 423 is protected with an AMULET-based lease, and function 423 is expressed in machine code compiled from a compiled computer language. Function 423 constitutes a part of process 420 (i.e. subroutine, function, etc.) and function 423 may be called during execution of process 420. Function 423 of process 420 executes within code cocoon 424 created by management apparatus 400. Code cocoon 424 represents one or more RAM (random access memory) drive code cocoons mounted by image manager 435 that support unmanaged functions, such as function 423, in order to protect lease requests from function 423. The RAM drive code cocoon 424 is formed as a RAM drive in memory and, for example, having the file letter hidden from the Windows file management system so that no user of the machine can find or view the encrypted function 423, for example, using file system tools. Other than the fact that its file letter is hidden from the operating system and function 423 is kept in memory rather than on a physical device, this component in all other respects acts as a disk drive, serving up the encrypted function 423 whenever the software management apparatus 400 needs to render the DLL into memory in order to service a granted lease request Function 425 is protected with an AMULET-based lease, and function 425 is expressed in machine code compiled from a compiled computer language. Function 425 constitutes a part of process 420 (i.e. subroutine, function, etc.) and function 425 may be called during execution of process 420. Function 425 of process 420 executes within virtual machine code cocoon 426 created by software management apparatus 400. Virtual machine code cocoon 426 is mounted by the image manager 435. Lease protected function 425 is encrypted, and the encrypted function 425 is passed in the lease init request to the software management apparatus 400. The virtual machine code cocoon 426 executes function 425 in a virtual machine isolated from any processes running on the host computer and accessible only by software management apparatus 400. By running the caller's encrypted unmanaged function 425 in an isolated virtual machine code cocoon 426 accessible only by software management apparatus 400, the storage and execution of function 425 is invisible to anyone otherwise having access to the host computer.

Virtual machine code cocoon 426 can execute function 425 where function 425 is written for one operating system, and code cocoon 426 executing function 425 is called a host device running a completely different operating system in real time. In other words, software on a device running Windows could init a lease in which a VM code cocoon mounts a UNIX operating system, runs a UNIX algorithm for computing, returns the calculated result as a text file to the windows host which the original Windows calling software then consumes.

Ram drive code cocoon 424 and virtual machine code cocoon 426 may be mounted individually to support an AMULET, or, support multiple similar protected resources mounted within them if permitted by the rules of the AMULET. Ram drive code cocoon 424 and virtual machine code cocoon 426 that are allowed to be shared according to the rules of an AMULET may be allowed to persist in memory for some period of time after any originally hosted protected resources have expired, to permit potential use by future lease requests that require use of the Ram drive code cocoon 424 or virtual machine code cocoon 426. This feature may reduce the mounting of the Ram drive code cocoon 424 and virtual machine code cocoon 426 and associated infrastructure, which may reduce load time and system impact.

Shared memory module 442 contains an array of structures related to various lease init requests extracted and processed as being initially valid by lease generator 450. The individual structures are encrypted while in shared memory, and may contain timestamps, use counts, allowed thread IDs, caller passcode aliases, re-validation and re-issue intervals, and other information that indicates a valid lease. There may also be reason codes or other information related to the denial of a lease request (so long as that information would not aid a potential system hacker).

Shared memory module 442, in various implementations, provides a means to securely yet publicly share granted lease information with processes, such as process 420, as the processes are launched on the host computer. Shared memory module 442 is non-blocking unlike other means of sharing information between processes, and requires no point-to-point connection between process 420 and lease generator 450 so that communications between process 420 and lease generator 450 are therefore extremely fast. Individual array elements are encrypted key-discerning methods known only to the two components managing either end of the conversation are used to maintain security of share memory module 442. For example, in one possible implementation, each end of the conversation knows the interleave and masking pattern for interleaving the bytes of the encryption key into the bytes of the encrypted string itself, so that the creator of the encrypted string can pass the encryption key itself within the string, and the receiving knows which bytes, in which order, and with which masks to reconstruct the original encryption key. Multiple encryptions may be applied, with the order of the encryption methods and keys used known only to each end of the conversation, and with the key embedded in one layer of the encryption actually used for any one of the subsequent encryptions with the relationship of which key is used for which encryption known only to the two components involved in the exchange.

Shared memory module 455 provides a public yet secure means for process 420 to submit lease init requests and lease requests, and to obtain responses to those lease init requests and lease requests, without blocking either process 420 or the software management apparatus 400. Shared memory module 455 maintains stacks of lease init requests, lease requests and granted leases for retrieval by lease manager 430 and process 420. Shared memory module 455 may also provides status information stacks on its own behaviors and performance for communication manager 448.

The shared memory module 455 provides a means to securely yet publicly share granted lease information with processes, such as process 420, as the processes are launched on the host computer. Shared memory module 455 is non-blocking and requires no point-to-point connection between lease generator 450 or any of the consumers of the lease init requests and requests information stored in 455, which may include communications manager 448, lease manager 430, and/or the calling function 462. Communications are therefore extremely fast. However, because the communications are public, the communications may be insecure. Accordingly, security is maintained by encrypting the individual array elements and by using key-discerning methods known only to the two components managing either end of the conversation.

Communication manager 448 manages asynchronous access to shared memory module 442 by multiple callers. Communication manager 448 monitors memory usage and shared memory module integrity for shared memory modules such as shared memory module 455 and shared memory module 442. Communication manager 448, in this implementation, mounts several threads that monitor memory usage and shared memory module corruptions, periodically making encrypted backups for healthy shared memory modules. When demand for memory is high, communication manager 448 may mount additional shared memory modules, such as shared memory module 442, to handle the load, scaling these additional shared memory modules back when demand drops. Communication manager 448 may also replace corrupted shared memory modules as needed from encrypted backups stored elsewhere in the system.

Shared memory such as memory 442, 455 is used as a semi-detached conveyance for asynchronous information exchanges (primarily leases and AMULET/passkey initializations) between the lease manager 450 and functions 419, 421, 423, 425 as well as storage for runtime system configuration information. The associated structure is described in FIG. 9. Because shared memory is visible to all processes in software management apparatus 400, shared memory provides a very fast transport mechanism. However, precisely because it is visible to all processes, shared memory is inherently insecure. Therefore all messages to and from STLS/code cocoon system components and the protected licensee resource are stored in shared memory as passkeys that are encrypted.

Information is not exchanged directly between certain processes in software management apparatus 400 and functions 419, 421, 423, 425, in order to protect system components from bugs or weaknesses in functions 419, 421, 423, 425, which may be beyond the control of software management apparatus 400. There are two general types of use cases where functions 419, 421, 423, 425 need to communicate with the lease manager 450. The first case occurs during a lease init request when function 419 wants to initialize a passkey, and the second case occurs when functions 421, 423, 425 determines if a lease has been issued for a previous passkey request. The software management apparatus 400, in various implementations, is weighted performance-wise to favor the latter, in the expectation that an init request will support multiple subsequent lease validations based on the passkey. For example, when function 419 makes a lease init request, the lease init request is placed in shared memory 455 and control is immediately returned to the calling process 420 (that is, the behavior is asynchronous from the process of lease manager 450, and non-blocking). The process 420 may then loop or launch a thread while waiting for the lease manager 450 to service and respond to the lease init request. However, when the licensee's resource requests lease validation for a lease linked to a previous passkey request, the response is immediately available in memory 442. The reason for this is that once a valid lease init request has been honored by the lease manager 450, the lease manager 450 will continually generate lease renewals into memory 442 for as long as the lease conditions specified in the AMULET are still valid. This means a lease, if generated by the lease manager, is immediately available to the licensee's resource from that location. The lease manager is unaffected by when or if a previously generated lease was ever utilized by the AMULET/passkey link requestor (unless the AMULET/passkey link requestor voluntarily surrenders interest in leases for a passkey, which will cause the lease manger to cease generating lease renewals and clean up any lingering AMULET/passkey link artifacts related to that passkey). Any item stored in shared memory is in the form of an AMULET for security reasons.

The implementation of shared memory DLLs such as shared memory modules 442 455, in software management apparatus 400, is designed to accommodate large virtual machine farms and servers, if desired, and to support enterprises where developer licensing agreements require centralized control of not only the specific applications, but of the instances or copies of those applications being deployed, accessed, or utilized by end users. Such a design requires scalability, that is, being able to expand and contract the memory and other resources devoted to lease and AMULET/passkey link storage in response to demand. Ordinarily, the penalties of using shared memory as an inter-process transport include the fact that shared memory data segment allocation sizes are fixed by the linker at the time of compilation, and further that the contents of shared memory data segments must be pre-initialized at invocation of the DLL. Rather than attempt to re-engineer the stock behavior of shared-memory DLLs, the software management apparatus uses small fixed-size shared-memory DLLs as building blocks, stacking blocks up as needed and removing them as demand subsides.

When compiling shared-memory DLLs, the differentiation of one from another is through the data segment name and the module (file) name used to load the DLL. Ordinarily, shared memory DLLs are loaded implicitly by the operating system—as a an exported function, class or variable is called for by external code, the operating system seeks out a matching export declaration from among the DLLs available to it (usually assisted by a stub library or definition file associated with the DLL), and then automatically loads the first DLL containing that exported resource into memory on behalf of that external code. The external code does not have to know which DLL was needed to satisfy the call. The disadvantage to such a system is that one and only one DLL will ever be loaded implicitly to satisfy a given exported resource request, and when repeated calls to the same exported declaration are made by the caller (and or, any other caller), the same implicitly-loaded DLL's resource with the matching declaration will be called.

The software management apparatus 400 uses the same exported function signature to call identical shared-memory data segment byte arrays living in different DLLs, where which DLL the byte array was delivered from was controlled by the software management apparatus 400. To accomplish this, in various implementations, software management apparatus 400 uses explicit (as opposed to implicit) DLL loading—explicit loading of DLLs in Windows systems is enabled by the LoadLibrary( )Win32 function, which returns a handle to the loaded module. That handle, along with a text rendition of the exposed resource's exported name, can be passed to the GetProcAddress( )Win32 function to get a function pointer to the entry point of an accessor function written within the DLL to return the shared-memory address of that DLL's byte array.

Using this mechanism, the software management apparatus 400 may control which shared memory DLL is used to supply the shared-memory byte array to store a particular AMULET, and the software management apparatus can distribute AMULET(s) among as many shared memory DLLs as the operating system can support (in 64-bit systems, this is largely a matter of how much memory and swap disk space is available in the host machine). The software management apparatus may free any libraries deemed unnecessary via the Win32 LoadLibrary( ) function.

As each AMULET/passkey request is presented to the lease manager 430 (these always arrive in shared memory DLL 0, which is mounted by default by the software management apparatus upon startup), the lease manager 430 looks for any underutilized memory in DLLs that have already been mounted. If space is found and the AMULET/passkey ID link is otherwise valid, the handle of the assigned DLL as loaded into memory is included in the approved AMULET/passkey ID returned link information. If no underutilized existing loaded DLLs are found, then the AMULET/code cocoon system mounts an unused DLL from disk, and returns the new module handle with the approved AMULET/passkey ID returned link information. The lease manager's lease monitoring thread, which looks for expired and surrendered leases and over-many lease validation failures, will free up unused shared-memory DLL modules in memory as it is cleaning up.

The software management apparatus may create new source shared-memory DLLs on the disk drive if needed. The shared memory data segment names are published in the rendered DLL at known locations by the linker in the compilation process. Therefore, the software management apparatus may without human intervention copy an existing shared memory DLL, tweak the copy's shared-memory data segment name and exported resources names, change the file name of the copied DLL via a numbering system commensurate with other shared-memory DLLs, and generate as many source shared-memory file DLLs as the operating system can handle.

Tool 470 allows the developer to license and configure one or more AMULET(s) and to set up the config.files that act as containers for AMULET(s). Tool 470 may be available online, in various implementations, and tool 470 may support modification, license renewal, and upgrades for existing AMULET(s) and config.files. The output of tool 470 may be config.file 473 that includes the AMULET(s) that ultimately control all the behaviors of granted lease requests, including code cocoons and optional limited caller edits in their own environment.

Config.file 473 includes one or more AMULET(s). Config.file 473 is generated by tool 470. The AMULET(s) contained in config.file 473 comprise all control logic and control parameters needed to support a lease request, as well as security for the AMULET and for config.file 473.

Install package 476 installs target software 417 including function 419 onto the host computer. If necessary, install package 476 may install portions of software management apparatus 400 onto the host computer as may be necessary to implement the lease protection of function 419. In some instances, the portions of the software management apparatus 40 may already exist on the host computer either from previous installations or as incorporated into the operating system of the host computer. Install package 476 may uses helper APIs to copy config.file 473, and any optional admin AMULET limits files, into the appropriate subdirectories, such as folder 440, in the host computer. Install package 476 ensures that the caller's AMULET config.file and any optional admin AMULET limits files end up in the correct location on the host computer along with the portions of software management apparatus necessary to implement lease protection of one or more functions, such as function 419, of developer's target software 417. Function 419 in combination with the remainder of target software 417 executes as process 420 on the host computer, with function 419 executing as function 421, 423, 425.

Folder 440, in this implementation, is the folder into which new or modified config.files, such as config.file 473, is accepted (or from which they are deleted) for detection by lease generator 450. These files generally arrive via install package 476 or upon initiation of process 420. In various implementations, the lease generator 450 may use Windows file system changed event notifications to detect changes in the contents of folder 440, and lease generator 450 may respond to changes in contents of folder 440.

Folder 479 represents the file folder into which new or modified admin AMULET limit files are accepted (or from which they are deleted) for detection by the lease generator 450. New or modified admin AMULET limit files generally arrive in folder 479 via install package 476 or upon initiation of process 420. In various implementations, the lease generator 450 may use Windows file system changed event notifications to detect changes (e.g. additions or deletions) in the contents of folder 479, and lease generator 450 may respond to changes in contents of folder 479.

If an AMULET is set up to expect it, an end user may use administration tool 483 to implement end user control in the admin AMULET to further refine and constrain the permissions contained in the AMULET file. Accordingly, the end user may control the deployment of target software 417 throughout end user's organization. Administration tool 483 allows the end user to impose post-initial-online-AMULET-configuration limitations upon an AMULET, which are contained in the admin AMULET file, to be included in the rules as interpreted by the lease manager 430.

Multiple Admin AMULET limits files that contain AMULET rules filtering for a given AMULET contained in a configuration file are allowed. Each author of an admin AMULET may be designated with an authority level, and the software management apparatus 400 may compare authority levels of all entries in all Admin AMULET limits files which reference a given AMULET to determine what the final runtime instance rules set is for a lease init request.

In, for example, Windows operating systems (such as Windows CE, Windows Phone, Windows XP, Windows 7, or Windows 8), executable files, dynamic link libraries, and other files associated with an application are stored on the disk file system in the same form in which they will appear in memory once executed. When compressed or "zipped", they are decompressed to a temporary file on disk, which is then identical to the image that will appear in memory at runtime. Even when encrypted by the operating system, the encryption keys and methods are often the same across all of the files in a volume, or even across all the files in the entire system. And even when encrypted via the notoriously-weak, NSA-enabling encryption deployed by most operating systems, there is no way for the operating system to tell if the file that was encrypted is the same version of the file the other components of the application is expecting, unless the application renders these checks itself. All of these limitations allow hackers opportunities to interfere with or corrupt an application. If the case where there is no encryption, hackers can identify the location of the runtime image of a file in memory by comparing the file's disk image to blocks of memory. In the case of an encrypted source file, the hacker needs merely to set an operating system event upon loading of the disk file, and find the memory that was altered immediately after the load—this memory location will contain the same file after decryption.

Most protection schemes for computers assume the unauthorized user will access the computer via a network connect, and attempt to protect the computer by defending network connections. An unauthorized user wishing to extract intellectual property inappropriately from software may not attack the system through a network connection, rather, the unauthorized user may buy a single legitimate copy of the software and install in on their computer, hacking it using other software installed on the same machine—that is, from inside. Or, an unauthorized user may use a virus that installs on the computer via network thereby attaining internal access, or software hidden on a thumb drive, or social engineering to gain internal access to a computer. Once inside, all of the techniques for comparing the file's disk image to blocks of memory become available to the hacker.

Either a code cocoon, such as code cocoon 424, or a virtual machine code cocoon, such as virtual machine code cocoon 426, inhibit comparisons between the file's disk image and blocks of memory. Both the code cocoon and the virtual machine code cocoon verify that source files are the exact versions and contents expected as established by the user at AMULET configuration through SHA2 hashes of the original source files.

The code cocoon uses a modified version of a random access memory (RAM) drive to provide the additional layer of security. Both code cocoon forms reside on the same platform, which is a uniquely customized version of a random access memory (RAM) drive. A RAM drive is not a physical hard drive, but is, instead, an emulation of a hard drive in memory—normally, from the perspective of the operating system and the user. The RAM drive mounts files and folders the same way that a hard drive does, is assigned a drive letter just like a hard drive partition would be, and is recognized by software and utilities exactly as a hard drive would be.

The software management apparatus 400 customizes a RAM drive for use as a code cocoon by not allowing the operating to assign a drive letter to it or to otherwise recognize a RAM drive as it would a hard drive. Customization includes encryption of the drive and a non-standard interleaving of the RAM drive's bytes in memory such that the bytes in memory do not resemble in value or order the bytes stored on a hard drive. Only software management apparatus 400 knows that the memory assigned to it is in fact a RAM drive and only the AMULET system retains the internal handles and pointers necessary to address it as a RAM drive. Upon initial startup of the host operating system, the image manager 435 creates a RAM drive in memory from reserved memory data segments assigned to the process thread of image manager 435, but image manager 435 consumes and deflects the events publishing the existence of the RAM drive to the operating system. The low-level means of accessing the RAM drive (via data segment offset and load address) is kept private to image manager 435.

Image manager 435 loads code cocoon files, function 419 for example, from the hard drive into the RAM drive, interlacing and encrypting (or re-encrypting) the function 419 in a unique pattern as function 419 is loaded, so that no file load event can be tied to a specific memory location or vice versa, or byte sequence from the original hard disk file can be linked to a byte sequence on the RAM drive. Neither the newly encrypted-in-memory image of the file now on the RAM drive or the events associated with RAM drive file activity are visible to the operating system (or therefore, users). When in the course of normal use of a an application which contains an AMULET describing a code cocoon a code-cocoon-protected file needs to be accessed, image manager 435 knows through pre-registry to load that file in encrypted interlaced form from the hidden RAM drive rather than from the file's original location on the hard drive.

The virtual machine code cocoon, such as virtual machine code cocoon 426 enhances the concepts of the code cocoon, but may execute somewhat slower than the code cocoon. An in the code cocoon, a hidden RAM drive is mounted by image manager 435 at operating system startup. A single-file virtual machine with its own encrypted file system is then loaded onto the RAM drive. The information that would normally be published to the host operating system about the existence of the virtual machine is not published, but, instead, kept within the confines of the image manager 435. Now, pre-registered code-cocoon-protected files are interlaced and encrypted (or re-encrypted) onto the virtual machine's encrypted virtual hard drive, which is now effectually a RAM drive.

Virtual machine code cocoon -protected functions, such as function 425, are configured by the user during AMULET setup to accept input files containing any required parameters for passing, and to output a file at a known location on the virtual machine. The code-cocoon-protected component will be executed in process threads mounted by the virtual machine, and just before execution input files stored on the host hidden RAM drive will be transferred to the virtual machine. After completion of execution, output files generated by the execution will be transferred from the virtual machine back to the hidden host RAM drive. In this manner, every aspect of the code-cocoon protected component and its execution will be completely concealed and protected during runtime.

Despite the encryption and additional processing, the code cocoon or the virtual machine code cocoon may increase efficiency of operations that normally rely on frequent disk access especially where the same file or DLL is accessed multiple times. This is true because all operations (except initial load) in the code cocoon or the virtual machine code cocoon are performed in memory rather than from a hard drive, and memory access may be more than 1000 (one thousand) times faster than disk access. So with the combination of performing critical operations in compiled executable code, native C++ for example (itself much faster than interpreted or intermediate-compilation languages), operations that normally would require loads from a physical hard drive are now loading from memory instead can in some situations result in faster performance.

Figure 8:
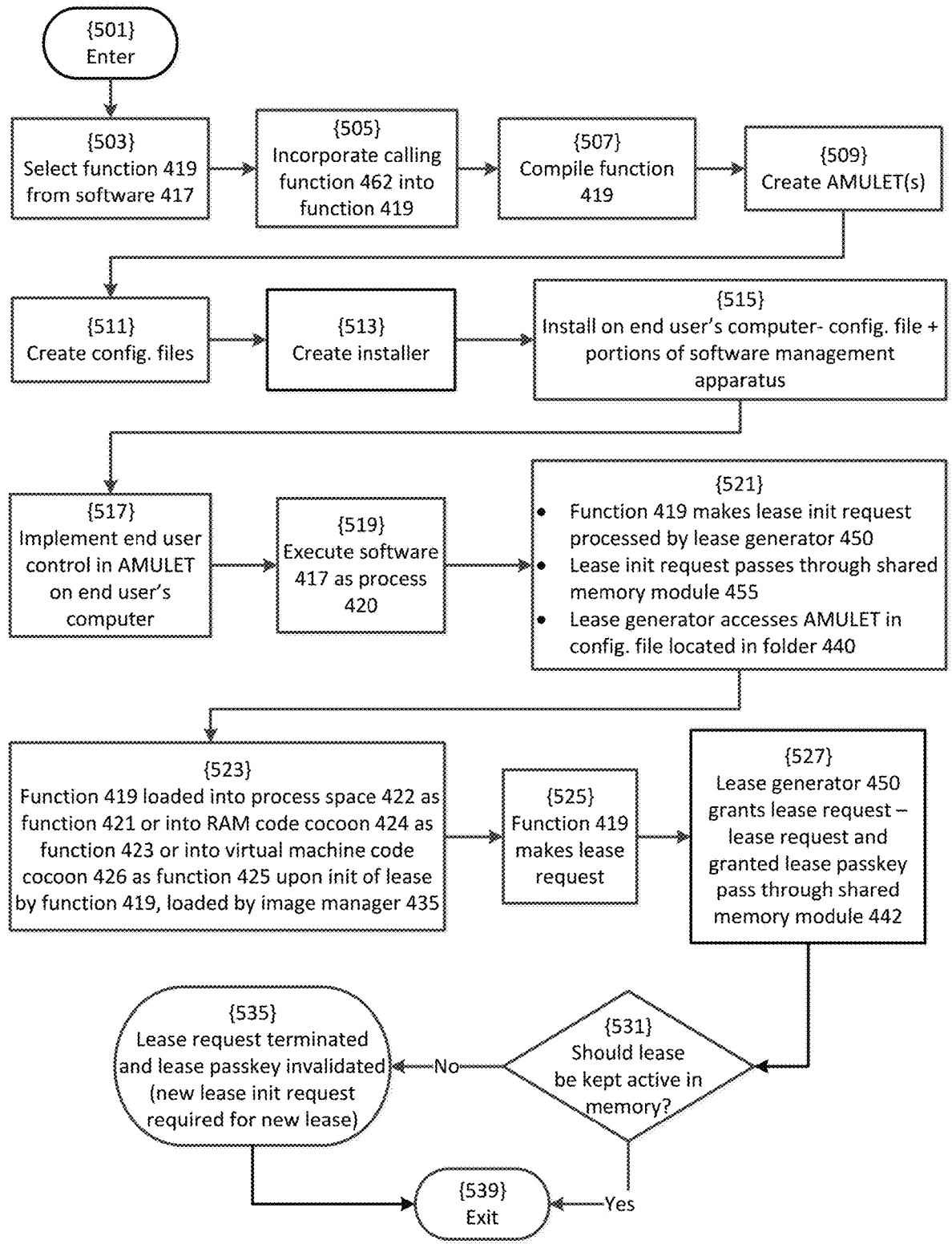
FIG. 8 illustrates by process flow chart exemplary operations of the exemplary software management apparatus of FIG. 7.

In operation, exemplary software management apparatus 400 may implement exemplary method 500, as illustrated in FIG. 8. As illustrated in FIG. 8, method 400 is entered at step 501. At step 503, the developer may select function 419 from target software 417. Function 419 may be critical to the operation of target software 417, and function 419 may include algorithms, data, or other information that developer wishes to maintain in secret from the end user or from unauthorized users. The developer may select function 419 from target software 417 using tool 470.

At step 505, calling function 462 is incorporated into function 419 to control the execution of one or more algorithms within function 419. Developer may use tool 470 to incorporate calling function 462 into function 419. Function 462 makes the lease init requests and lease requests for lease protected function 419.

At step 507, function 419, which includes calling function 462, is compiled. A multi-pass compiler may be used to compile function 419 at step 507, and the source code of calling function 462 may be obfuscated. Accordingly, function 419 may be considered secure following compilation at step 507.

At step 509, tool 470 creates one or more AMULET(s), which are encrypted, to control the operation of function 419. The one ore more AMULET(s) include logic and control parameters that will be used by lease generator 450 to determine the logical value of LEASE.

At step 511, tool 470 creates config.file(s) that include the one or more AMULET(s) created at step 509.

At step 513, tool 470 creates install package 476 that installs target software 417 including function 419 and the contfig.file(s) onto the host computer. If necessary, install package 476 may install portions of software management apparatus 400 onto the host computer as may be necessary to implement the lease protection of target software 417 including function 419.

Tool 470 includes interactive interfaces that allow the developer to select function 419 from target software 417, and to insert calling function 462 into function 419. Tool 470 may access tools such as cross compilers that, if necessary, translate function 419 from an interpreted language into a compiled language and that compile function 419. Tool 419 may allow the user to select protection of function 419 in managed process space, such as process space 422, code cocoon, such as code cocoon 424, or virtual machine code cocoon, such as virtual machine code cocoon 426 and to implement the protection so selected in the AMULET(s) and in the install package. Tool 419 may include a virtual machine for installation on the host computer in install package 470 along with any other software required for implementation.

At step 515, install package 470 installs target software 417 including function 419, the contfig.file(s), and portions of software management apparatus 400 (if necessary) onto the host computer.

At step 517, end user control is implemented in AMULET (s) on host computer, if this feature is enabled. The end user may control the deployment of the target software 417 including function 419 in end user's organization.

At step 519, the end user initiates execution of target software 417 as process 420 on the host computer.

At step 521, function 419 makes an initial lease request (lease init request) that is then processed by lease generator 450. This lease init request passes thru shared memory module 455 from function 419 to lease generator 450. Prompted by the lease init request, lease generator 450 accesses AMULET in config.file located in folder 440. The lease generator 450 decrypts AMULET(s) and checks the AMULET(s) for validity.

At step 523 the lease init request prompts the loading of function 419 loaded into process space 422 as function 421, the loading of function 419 or into code cocoon 424 as function 423, or the loading of function 419 into virtual machine code cocoon 426 as function 425 by image manager 435.

At step 525 function 419 (which is now one of function 421, 423, 425) makes a lease request At 527 lease generator 450 grants lease request. The lease request and granted lease pass between lease generator 450 and functions 421, 423, 425 through shared memory module 442. The lease request is generated by calling function 462 that had been incorporated into function 419 (which is now one of function 421, 423, 425). The lease is in the form of a logical LEASE=TRUE (granted) or LEASE=FALSE (ungranted) condition as determined by lease generator 450 using control logic and control variables embedded within the AMULET(s). If LEASE=TRUE as determined by lease generator 450, then function 419 (which is now one of function 421, 423, 425) will execute the one or more algorithms within function 419 under lease control. If LEASE=FALSE as determined by lease generator 450, then function 419 (which is now one of function 421, 423, 425) will not execute the one or more algorithms within function under lease control. Lease requests may be periodically made by function 419 to lease generator 450 during execution of process 420 including function 419, which is one of function 421, 423, 425.

At step 531, the software management apparatus 400 checks to determine if the lease should be kept alive in shared memory module 442. If yes, method 500 loops to step 537. If no, the lease is terminated at step 539 and a new init request is required to generate a new lease.

In general, method 400 including authorized lease requests and the associated process spaces, code cocoons, and virtual machine code cocoons are terminated under one of the following conditions:

1. Explicit request from the process to terminate, e.g. the end user terminates process under normal conditions.
2. The operating system of the host computer is shutting down;
3. A maximum lifespan time limit for a given lease or code cocoon has been reached as set in the control logic and control variables of the configuration file AMULET (the overarching AMULET that is associated with the configuration file itself, rather than the other AMULET (s) that control individual lease requests—the configuration file AMULET imposes a number of general limits that override limits set in the other AMULET(s) in the file);
4. A maximum number of errors (and/or unauthorized lease requests) has been generated for a given lease or process spaces, code cocoons, or virtual machine code cocoons as set in the control logic and control variables of the configuration file AMULET;
5. A maximum number of lease re-issues applied to all lease init requests and leases as specified in the as set in the control logic and control variables of the configuration file AMULET has been reached for a specific lease init request;
6. No lease requests have been made of an issued lease init, or no process spaces, code cocoons, and virtual machine code cocoons access utilized, in a given time period since the last request or access as established by a time limit as set in the control logic and control variables of the configuration file AMULET;
7. A lifespan time limit specified in the control logic and control variables in a lease-controlling AMULET has been reached for a lease request or process spaces, code cocoons, and virtual machine code cocoons;
8. A maximum number of lease re-issues against the same lease init request and leases as specified in the control logic and control variables of a particular lease-controlling AMULET has been reached;
9. A function caller with a valid active lease init request has specifically requested a termination of its current lease init request and password or process spaces, code cocoons, and virtual machine code cocoons it is authorized to access as set in the control logic and control variables;
10. No config.files are present in the config.file folder; or,
11. In addition to the limits imposed by the general limits of the configuration file AMULET and the limits in a particular lease-controlling AMULET, limits may also appear in the Admin AMULET Limits file. In the case where multiple files contain applicable limits to a lease init request and lease or code cocoon, the most restrictive limit in effect wins.

When termination of method 400 is deemed appropriate, the re-issue period an active lease init request and lease are currently in is allowed to expire. Then, process spaces, code cocoons, and virtual machine code cocoons associated with process 420 are removed from memory. The portions of software management apparatus 400 present on the host computer may continue to execute to manage other lease protected software on the host computer or to intercept any new lease init requests from newly initiated lease protected target software.

Figure 9:
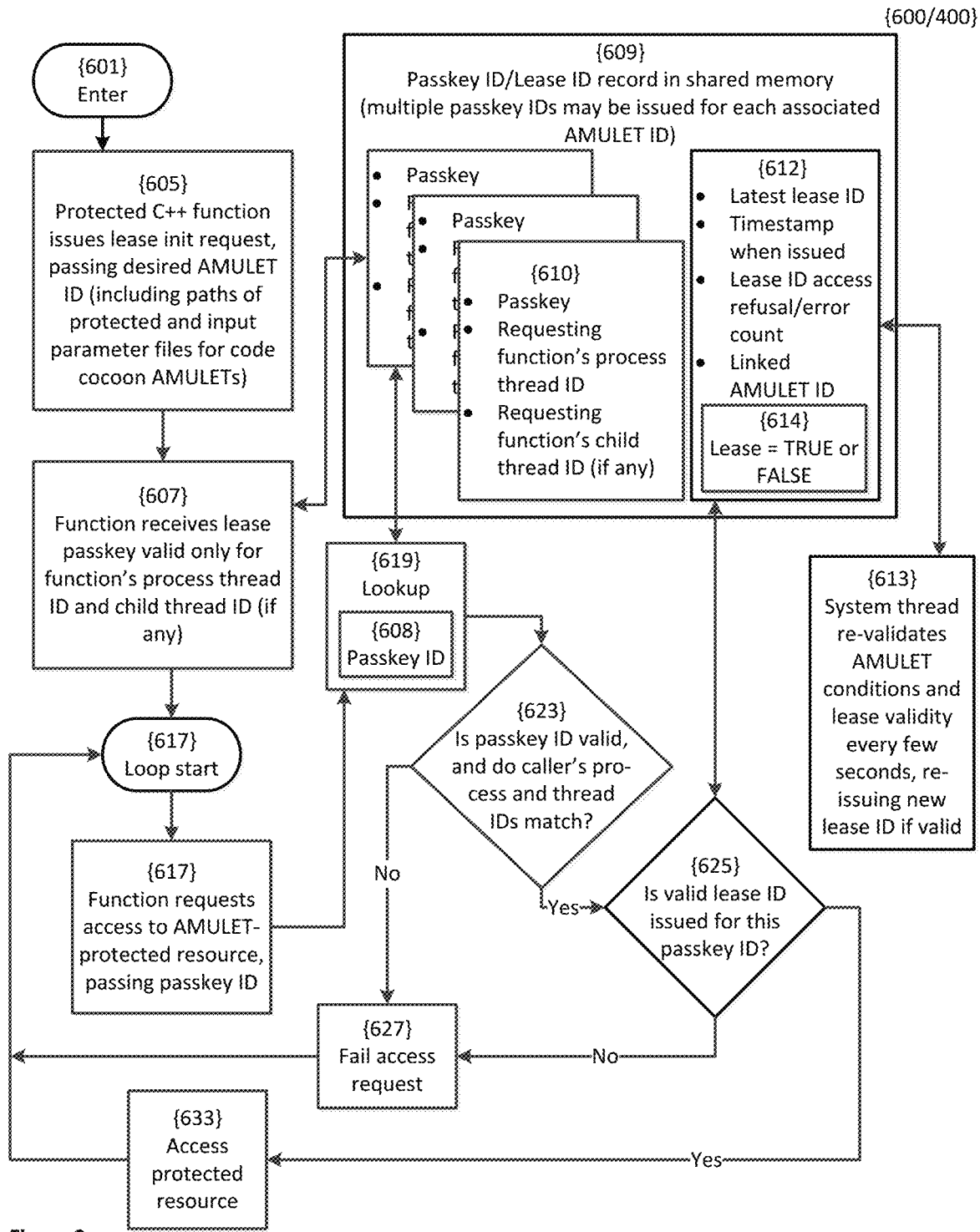
FIG. 9 illustrates by process flow chart exemplary handling of lease init requests and passkeys by the exemplary software management apparatus of FIG. 7; and, FIGS. 10 to 17 illustrated by process flow charts various portions of an exemplary implementation of a software management apparatus.
Figure 10:
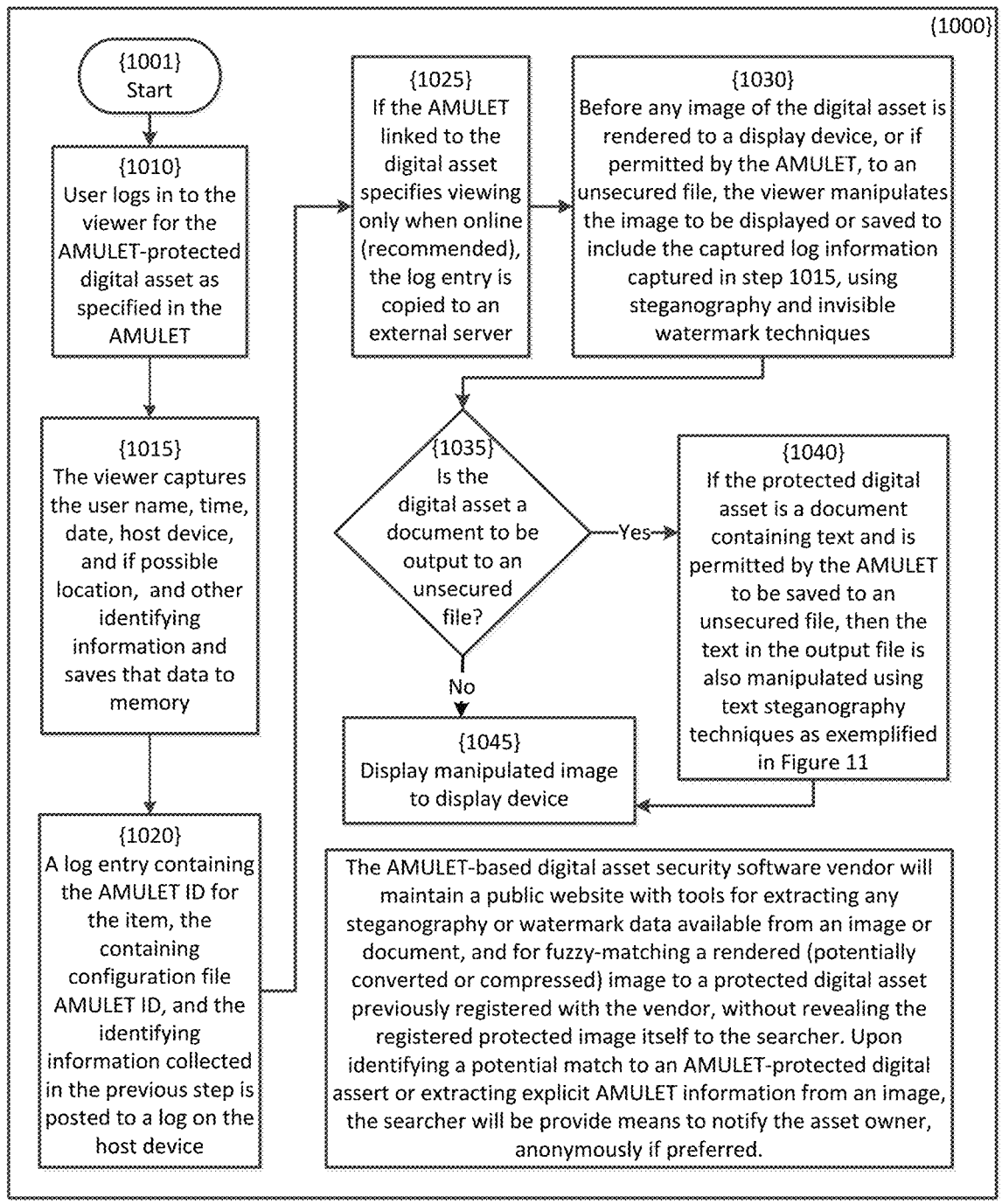
Figure 11:
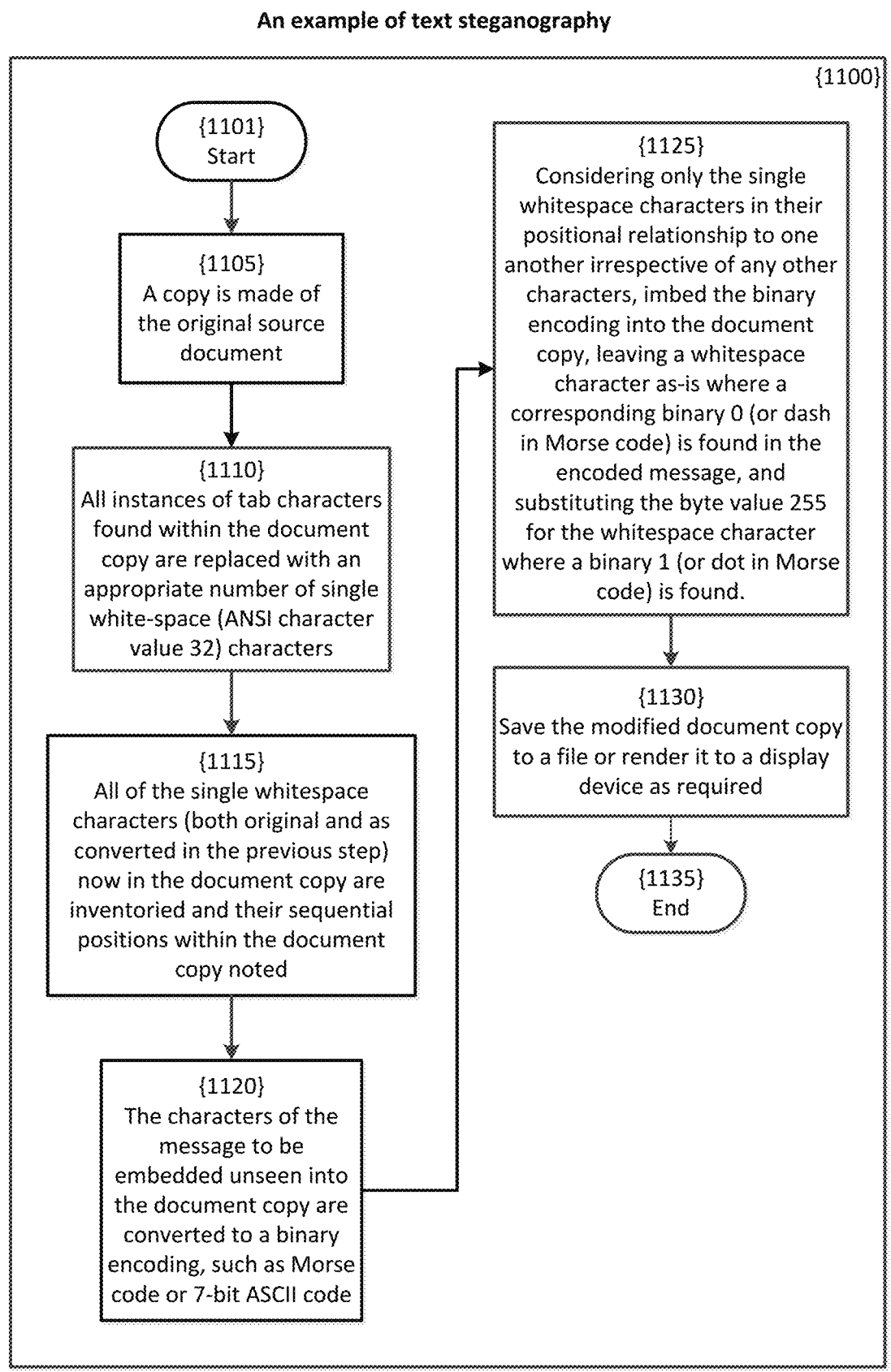
Figure 12:
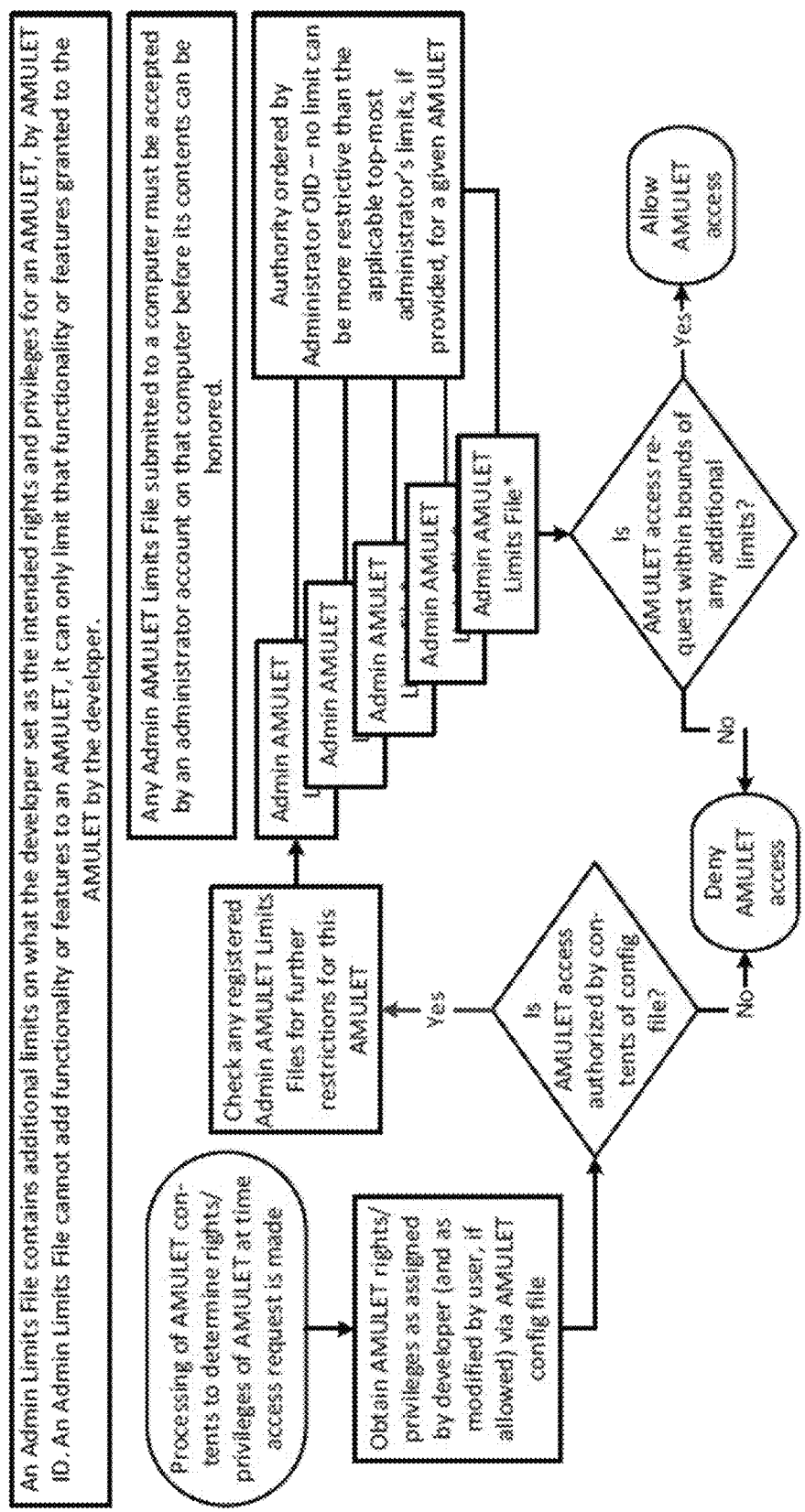
Figure 13:
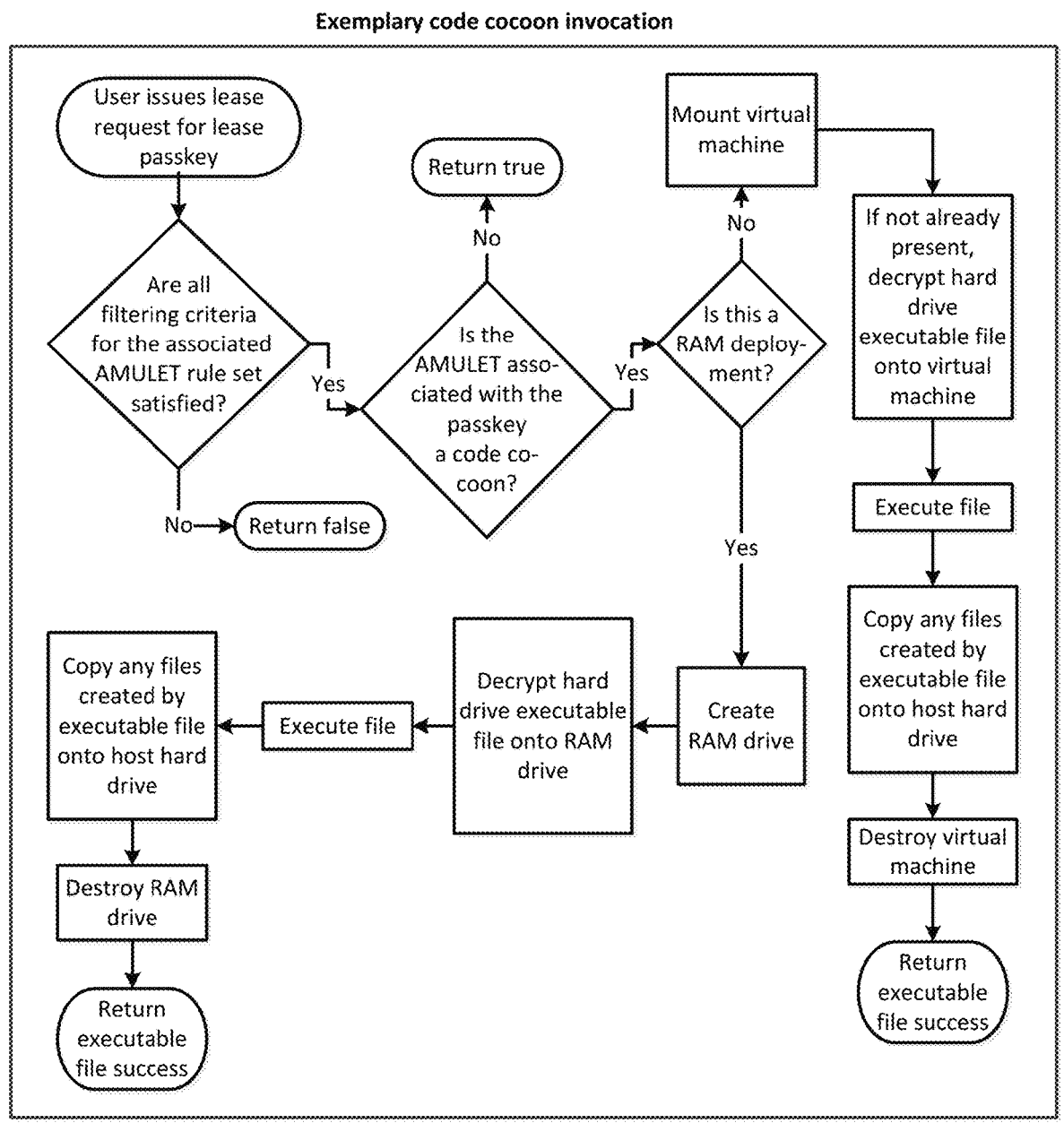
Figure 14:
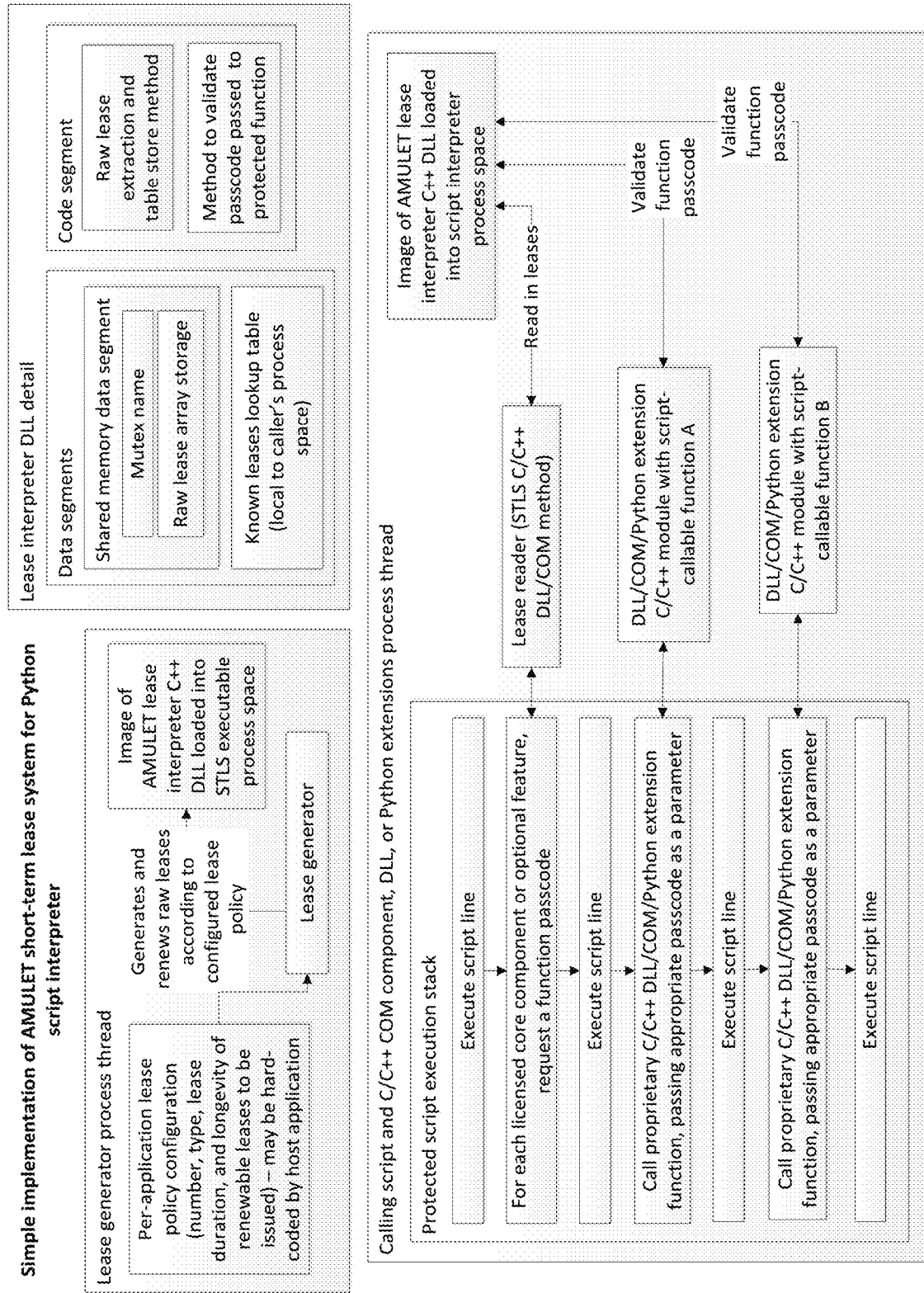
Figure 15:
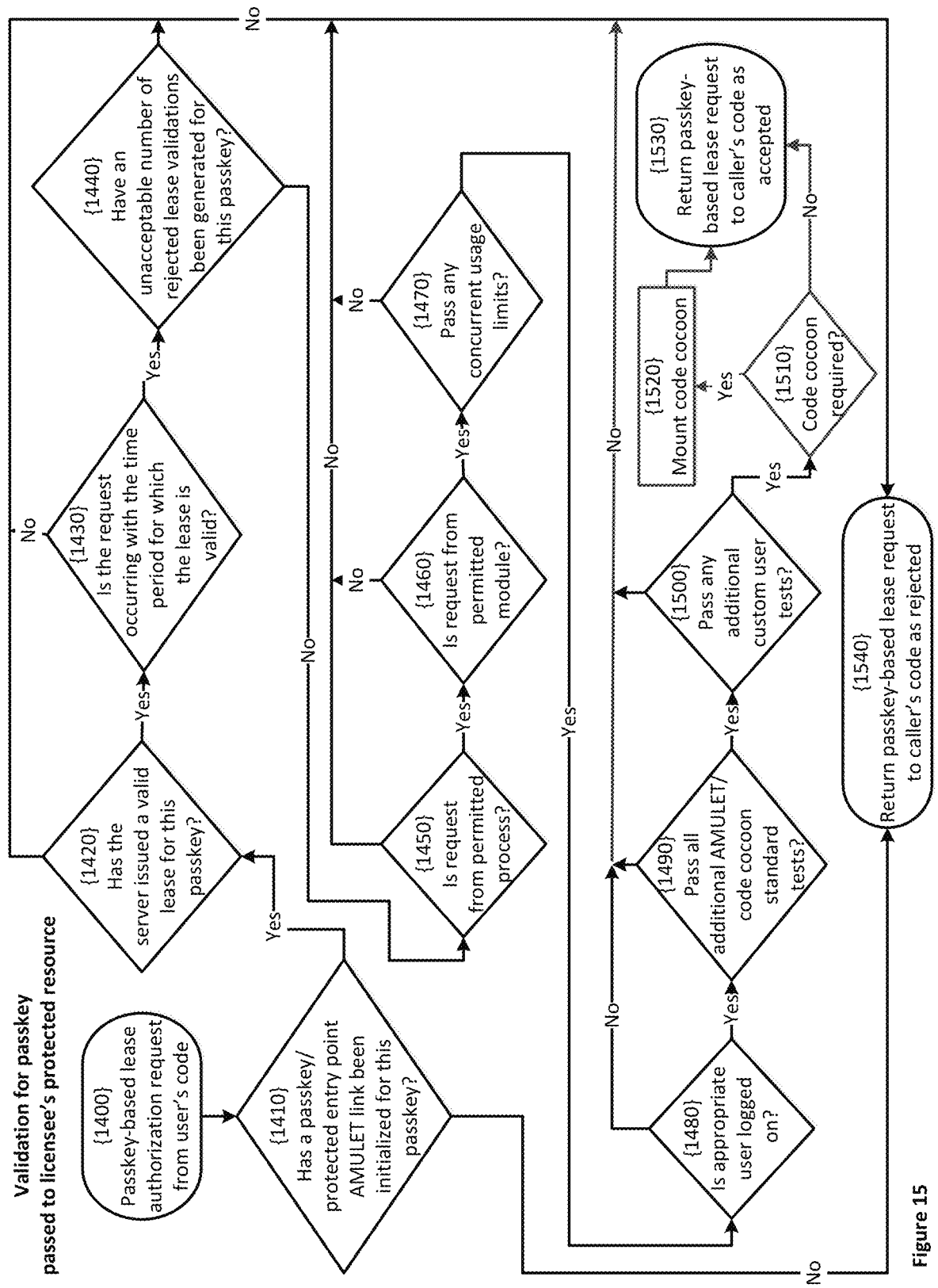
Figure 16:
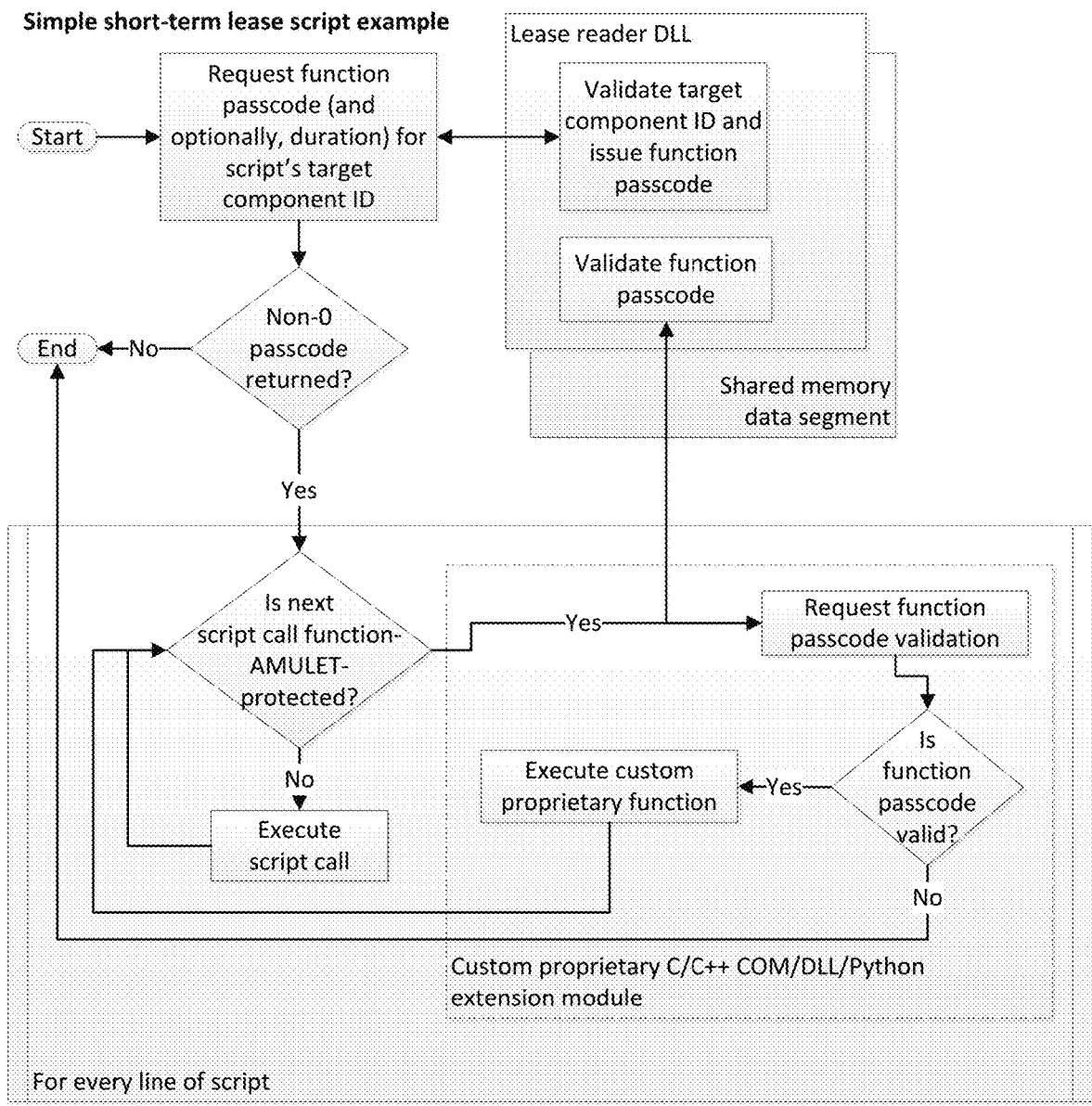
Figure 17:
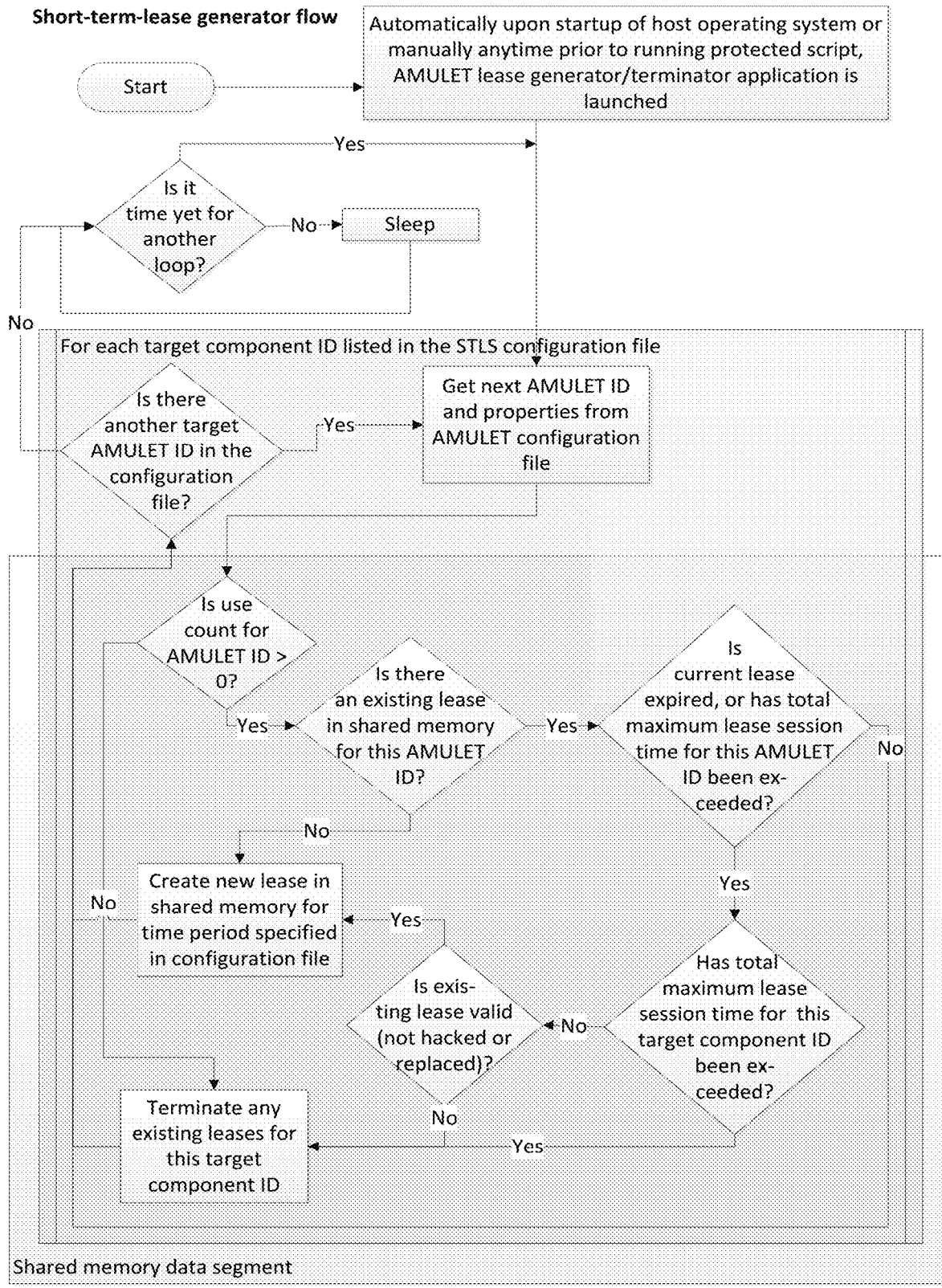

Method 600 illustrates the handling of lease init requests and passkey IDs, such as passkey ID 608. Step 601 of FIG. 9 represents the entry point for a function wanting to use an AMULET-protected resource such as function 419 at some time during execution. In step 605, the function issues a lease init request as shown in FIG. 8, step 521.

In step 607 of FIG. 9, the function receives back passkey 610 that is valid only for the function's process thread and child thread (if any). No other process or thread can use the passkey to request access to the AMULET-protected resource. Passkey 610 is a memory structure, and the passkey ID may be considered as a pointer that points at the passkey 610 memory structure. The passkey 610 represents a token to a lease ID 612 stored in a record in shared memory, as shown in 609. The lease ID 612 will be re-validated and changed by the system as conditions in the operating system and environment change, for example, every few seconds. Even if an unauthorized entity obtains the lease ID 612 from the shared memory record, the lease ID 612 would be valid until the next lease ID re-validation per method 600. The passkey 610 is re-linked to the new lease ID 612 each time a lease is revalidated and re-issued, ensuring the passkey 610 will be honored for a new lease 614, regardless of its ID, as long as the passkey 610 is offered by the same process thread and child thread that made the lease init request.

In addition to preventing misuse of either the passkey or the lease ID, method 600 of software management apparatus 400 ensures that other passkeys linked to other lease IDs are not blocked or otherwise impacted by the hanging or improper termination of a thread holding a passkey to a lease ID, and that re-evaluation of the lease 614 via its linked AMULET is not intentionally stalled to inhibit the system's detection of an invalid changed condition for the AMULET.

Software management apparatus 400 allows multiple asynchronous accesses to the same protected resource in the same time frame from any number of applications, functions, or scripts calling from any number of processes and or child threads. Software management apparatus 400 supports any combination of two different sets of circumstances. In the first set of circumstances, a vendor wants to allow different groups of rules to be in place for the same protected resource. This is useful when the developer wants to provide a single utility DLL containing functions or classes to be shared by two or more different applications, but the authorized users of those applications have purchased different access levels to the features supported by the protected functions. To support this set of conditions, the developer may provide multiple AMULET(s) within the same AMULET configuration file, and each application owner will be given a different AMULET ID to use for accessing the protected resource. Each lease init of each AMULET ID may result in a different passkey ID. Accordingly, software management apparatus 400 supports controlling protected resource access through different groups of rules (AMULET(s)) applying to the same shared resource.

In the second set of conditions, the developer desires to use just one set of rules across two or more applications, but wants access levels to features controlled by access rules with the AMULET itself. To support this second set of conditions, the AMULET will determine rights to access based on the calling application's, function's, or script's process thread ID, child thread ID, process name, or other environmental conditionals with the AMULET rules, and if access is granted, will assign a different passkey ID to each calling instance. These means that multiple lease inits for the same AMULET, each from a different calling function, will potentially result in multiple passkey ID's being issued for the same lease ID if all of the rules in the AMULET were passed with the same results with only the process ID, child thread ID, or process name being different (if the rules passed are not identical otherwise because of differences in some other tested environmental state, a different lease ID will be issued). In block 609 of FIG. 9, multiple passkey IDs are shown issued for the same lease ID.

The software management system 400 uses the passkey ID to link function 419 (executing as function 412, 423, or 425) to a set of rules represented by the AMULET ID and the lease ID indicating that the software management system 400 has either accepted or rejected the lease init request or the lease request. A continuous loop is traversed by the software management apparatus 400 with the following sequence of operations with respect to passkey ID(s), lease ID(s), and AMULET ID(s):

1. The lease manager 430 evaluates periodically every issued lease ID for expiration and evaluates lease ID for other violations of the associated AMULET ID rules in a separate thread from the lease generator 450 and in a separate thread from process 420. Lease manager 430 processes new lease init requests for legitimacy and for lease init requests that are valid, stores the relationship between the lease ID and the AMULET ID in public space where the lease ID and the AMULET ID may be viewed by calling function 462. Leases, such as lease 614, that require renewal and meet the terms of the associated AMULET IDs and application configuration settings are retired and a new lease ID is issued new replacement leases. When lease conditions and histories do not meet the terms of the associated AMULET ID or application configuration, leases are retired without being renewed, effectively rendering any associated passkey IDs invalid. Invalidated memory allocations and orphaned lease records are cleaned up from memory by a thread of the lease manager 430 as necessary; and 2. Periodically applications will initialize lease ID relationships between passkey IDs and AMULET IDs (and by implication, the protected resources embedded in the AMULET ID configuration), and for each initialization request will make at lease one subsequent AMULET-protected function access request. Lease inits are handled by the lease manager thread as noted above, and the AMULET-protected resource access requests defined in the AMULET IDs will be serviced by dynamic link library API functions of the software management system 400. Upon receiving the request, the dynamic link library API functions code will look up the AMULET ID associated with the passkey ID passed in and ascertain whether or not a valid short-term lease ID has been issued for the associated AMULET ID by the lease manager. If so, the dynamic link library API functions code will then validate whether all the elements of the shared-memory passkey ID/lease ID/AMULET ID are valid and if so, will execute the AMULET-protected resource. In either event of denial of access to the AMULET-protected resource and immediate return or after permitted access to the AMULET-protected resource and the resulting return, program flow and control is returned along with the error message or error code (as appropriate) to the calling function's code or script execution stack and stack pointer.

Step 601 of FIG. 9 represents the entry point for a function such as function 462 wanting to use an AMULET-protected resource at some point later in its execution When making a lease init request as shown in step 605 of FIG. 9, the function making the lease init request, such as function 462, may optionally provide a suggested passkey ID. Upon successfully validating the legitimacy of the lease init request in step 607, lease manager 430 will return a passkey ID for the function to use to reference lease IDs linked to that passkey. If a suggested passkey ID was provided by the calling function which meets the uniqueness and length requirements for a passkey ID as determined by software management apparatus 400, the suggested passkey ID will be returned to the calling function as the passkey ID. Otherwise, lease manager 430 will generate and return a suitable passkey ID. The passkey ID is valid only for the process thread ID, and if applicable, child thread ID, of the function making the lease init request. No other process or child thread may use the passkey to request access to the AMULET-protected resource associated with the lease init request.

At the same time as the passkey ID is returned, lease manager 430 will generate a new record for linking passkey IDs, lease IDs, and AMULET ID in shared memory module 442 of FIG. 7, illustrated as record 609 in FIG. 9. The passkey ID/lease ID linking record also contains information as to the calling function's process and child thread IDs, the timestamp when the latest lease ID was issued or denied, whether the last lease validity review resulted in a granted lease, and the AMULET ID for the AMULET which supports lease validation review. Once a valid passkey ID has been returned to the function making the lease init request the calling function will use that passkey ID from the calling function's process, and if applicable child, thread, to access the desired AMULET-protected resource. For each access desired, the calling function will pass to the compiled code's access function the passkey ID as shown in step 617. The compiled code's access function will validate the passkey ID using the shared memory record 609, compare the compiled code's access function process and child thread IDs in step 623, and check for a valid associated lease ID in 625. If the most recent lease ID associated with the passkey ID is not granted, the AMULET-protected resource access will fail in step 627. If the most recent lease ID associated with the passkey ID was granted, the compiled code will exercise the AMULET-protected resource following step 633.

The lease ID associated with a passkey ID will be periodically re-validated and changed by an independent thread of lease manager 430 as conditions in the operating system and environment change, and even if an unauthorized user could obtain the lease ID from shared memory record, the lease ID is valid for only a limited time, in this implementation. The passkey, however, is re-linked to the new issued lease ID in record 609 each time a lease is revalidated and re-issued, ensuring the associated passkey ID will always be honored for a new lease if granted, regardless of its current lease ID, as long as the passkey ID associated with it is offered by the same process and child thread that issued the lease init request. In addition to preventing misuse of either the passkey or the lease ID, this system ensures that any other passkey ID linked to a lease ID is not blocked or otherwise impacted by the hanging or improper termination of a thread holding a passkey ID linked to a lease ID, and that re-evaluating of the lease ID's lease conditions via its linked AMULET is not intentionally stalled to inhibit the system's detection of an invalid changed condition for the associated AMULET.

Record 609 in shared memory 442 is encrypted using a key generated at system startup and made known to the steps 607 and 619 via a common library used to provide the low-level functions which access records 609 in shared memory 442 on behalf of calling functions.

FIGS. 10 to 17 illustrated by process flow charts various portions of an exemplary implementation of a software management apparatus.

In various implementations, secure installation for a legacy or otherwise completely insecure application may be provided without the user having to write a single line of code. The user would provide the name and location of their executable file and any dependencies in a form (could be on a web page), and fill out the AMULET using an AMULET editor to tell what security to implement. The user will then be provided with a pre-compiled executable file that, without any work from them:

1. Encrypts their executable and dependencies into unrecognizable forms that cannot be launched and embeds the encrypted components into the new pre-compiled executable file—their original executable and dependencies never see the light of day on a licensee's device;
2. Upon execution of the new file, does the following:
    a. Automatically creates a hidden RAM drive;
    b. Decrypts into its original form their executable and dependencies and mounts them on the hidden RAM drive;
    c. Validates the AMULET, and runs their decrypted code; and
    d. Continually inspects the environment looking for any changes to the validity of the AMULET during runtime of the user's application.

The same may be done images, documents, and video (that applies steganography to the outputs to make them traceable, provides audit trailing, and does fuzzy comparisons of protected works so that John Q. Public can anonymously check out a rendered image, document, snippet, or video—even after compression or rendering into other formats—he has in his possession to see if it might be plagiarized from one of our registered customers. The registered user of our services would get all of that painlessly by merely uploading to us the image, document, or video to be protected, and distributing only the wrapped version he/she gets back from us in exchange. No coding, no fuss, no need to understand how it works.

An exemplary example of steganography for text documents (including Microsoft Word and the like) that has the unique ability to survive transforms from Microsoft Word to plain text, from *.doc file format to *.pdf format to *.txt format and anything in between:

1. Parse the original document for all occurrences of tabs and spaces, replacing all tabs with and appropriate number of spaces, keeping a record of the position in the text where every space now occurs in the document (whether there originally or as a result of tab replacement);

2. Express the message you want to embed in the text as Morse code (dots-dashes);
3. Considering only the spaces now in the current text in sequential order, for every place in your Morse code rendering where a "dot" occurs, skip the space in the text (leave the space as it is). Wherever a "dash" occurs in your Morse code, replace that space with an ALT-255 keystroke (hold down the ALT key, type the numbers "255", and release the ALT key—you will see that in the text a space-like character is generated in appearance, but binarily it is not a space).
4. The message is now invisibly embedded in the text. Adobe Reader, Microsoft Word, even Notepad and web pages all seem to respect the ALT-255 keystrokes and preserve them in place of spaces while rendering the appearance as a space on the screen. There are other character-for-character substitutions that can be made, but the space/ALT-255 replacement is effective because spaces occur so frequently in text (especially after tab substitutions) that you can embed long hidden messages.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A method of controlling access to a digital asset, comprising the steps of:
    forming an encrypted self-validating string external to said digital asset, the encrypted self-validating string comprising a string interwoven with a duplicate string, the duplicate string being duplicative of the string, the string and the duplicate string being encrypted, the string comprising control logic and a control parameter set comprising two or more control parameters, the encrypted self-validating string validated by the string and the duplicate string forming the same result when decrypted and separated;
linking said digital asset with the encrypted self-validating string through an encrypted identifier extractable either from the encrypted digital asset or from the encrypted self-validating string, at least portions of said digital asset being encrypted;
    accessing said digital asset by the steps of:
        obtaining a set of environmental conditions from a computer;
        obtaining the control logic and the control parameter set by decrypting the encrypted self-validating string;
        forming a set of responses by applying the control logic and the control parameter set against the set of environmental conditions at a specific time;
        forming a permission that is either valid or invalid using the set of responses;
        constructing at least a portion of an access code allowing decrypting of at least portions of said digital asset using the set of responses and an identifier decrypted from the encrypted identifier if the permission is valid; and
    accessing said digital asset including encrypted portions of said digital asset using the access code.

2. The method of claim 1 further comprising the step of: employing networked communication in practicing said method at least in part.

3. The method of claim 1 wherein said method is performed at least in part within a virtual machine.

4. The method of claim 1 wherein said method is implemented entirely using software operably communicating with a processor.

5. The method of claim 1, further comprising the step of selecting the control logic and the control parameter set for inclusion in the encrypted string.

6. The method of claim 1, said digital asset comprising a .Net framework language.

7. The method of claim 1, said digital asset comprising bytecode derived from a .Net framework language.

8. The method of claim 1, said digital asset comprising machine code resulting from multi-pass compilation of a source compiled language code with optimization and obfuscation.

9. The method of claim 1, the control parameter set comprising a selected control parameter selected from a group consisting of a specified time range, a specified process name, a specified thread, a specified active directory, a specified authentication group, a specified executable file, a specified OCX file, a specified module, a specified DLL, a specified host name, a specified MAC address, a specified GIS location, and a specified IP address.

10. The method of claim 1, said digital asset and the encrypted string cooperate, at least in part, through shared memory in process space.

11. The method of claim 1, said digital asset and the encrypted string cooperate, at least in part, through a RAM drive in memory, the RAM drive at least partially hidden from an operating system of the computer.

12. The method of claim 1, said digital asset and the encrypted string cooperate, at least in part, within a virtual machine.

13. The method of claim 1, further comprising the step of: using multiple encrypted strings with each encrypted self-validating string of the multiple encrypted strings conferring a different right of access to said digital asset including encrypted portions.

14. The method of claim 13, wherein the rights of access form a hierarchy.

15. A method of accessing a digital asset, comprising:
    transmitting to a computer said digital asset that is encrypted at least in part and an encrypted self-validating string external to said digital asset and linked to said digital asset by an encrypted identifier extractable either from the digital asset or from the encrypted self-validating string, the encrypted self-validating string comprising a string interwoven with a duplicate string, the duplicate string being duplicative of the string, the string and the duplicate string being encrypted, the string comprising a control logic and a control parameter set comprising two or more control parameters, the control logic and the control parameter set being selected beforehand in another process, the encrypted self-validating string validated by the string and the duplicate string forming the same result when decrypted and separated;
    obtaining a set of environmental conditions from the computer;
    obtaining the control logic and the control parameter set by decrypting the encrypted self-validating string;

forming a set of responses by applying the control logic and the control parameter set against the set of environmental conditions at a specific time;

forming a permission that is either valid or invalid from the set of responses; and constructing at least a portion of an access code allowing decrypting of said digital asset using the set of responses and an identifier decrypted from the encrypted identifier if the permission is valid.

16. The method of claim 15, further comprising the step of: decrypting using said digital asset using the access code.

17. The method of claim 15, further comprising the step of: implementing at least portions of said method using networked communication.

18. A method of controlling access to a digital asset using a tool, comprising the steps of:

selecting at least a portion of said digital asset using said tool, said tool encrypting the at least a portion of said digital asset thereby forming an encrypted digital asset;

forming an encrypted self-validating string external to the encrypted digital asset by said tool, the encrypted self-validating string comprising a string interwoven with a duplicate string, the duplicate string being duplicative of the string, the string and the duplicate string being encrypted, the string comprising a control logic and a control parameter set comprising two or more control parameters, the control logic and the control parameter set being selected using said tool;

linking using said tool the encrypted digital asset with the encrypted self-validating string using an encrypted identifier extractable either from the digital asset or from the encrypted self-validating string; and wherein the encrypted digital asset is accessed by performing the steps of:

obtaining a set of environmental conditions from a computer;

decrypting the encrypted self-validated string into the string and the duplicate string;

validating by comparing the string with the duplicate string;

obtaining the control logic and the control parameter set from the string;

forming a set of responses by applying the control logic and the control parameter set against the set of environmental conditions at a specific time;

forming a permission that is either valid or invalid from the set of responses; and constructing at least a portion of an access code allowing decrypting the encrypted digital asset using the set of responses and an identifier decrypted from the encrypted identifier if the permission is valid.

19. The method of claim 18, further comprising the step of: including at least portions of said method in an operating system of the compute.

20. The method of claim 18, wherein the computer cooperates securely with said digital asset and the computer cooperates securely with the encrypted self-validating string at least in part by networked communication.

* * * * *